(12) United States Patent
Kapur

(10) Patent No.: US 7,698,327 B2
(45) Date of Patent: Apr. 13, 2010

(54) UNIVERSAL SEARCH INTERFACE SYSTEMS AND METHODS

(75) Inventor: Shyam Kapur, Sunnyvale, CA (US)

(73) Assignee: Yahoo! Inc., Sunnyvale, CA (US)

( * ) Notice: Subject to any disclaimer, the term of this patent is extended or adjusted under 35 U.S.C. 154(b) by 762 days.

(21) Appl. No.: 10/818,752

(22) Filed: Apr. 5, 2004

(65) Prior Publication Data
US 2004/0249801 A1 Dec. 9, 2004

Related U.S. Application Data

(60) Provisional application No. 60/460,222, filed on Apr. 4, 2003.

(51) Int. Cl.
*G06F 7/00* (2006.01)
*G06F 17/30* (2006.01)

(52) U.S. Cl. ................ 707/706; 707/769; 707/779

(58) Field of Classification Search ............... None
See application file for complete search history.

(56) References Cited

U.S. PATENT DOCUMENTS

| | | | |
|---|---|---|---|
| 6,083,270 | A | 7/2000 | Scott |
| 6,332,219 | B1 * | 12/2001 | Curtis et al. ........... 717/170 |
| 6,449,617 | B1 * | 9/2002 | Quinn et al. ........... 707/100 |
| 6,529,899 | B1 * | 3/2003 | Kraft et al. ............ 707/3 |
| 6,691,104 | B1 * | 2/2004 | Kraft et al. ............ 707/3 |
| 2002/0116394 | A1 * | 8/2002 | Van Doorn ............. 707/104.1 |
| 2002/0154162 | A1 * | 10/2002 | Bhatia et al. ........... 345/745 |
| 2002/0198719 | A1 | 12/2002 | Gergic et al. |
| 2004/0128616 | A1 * | 7/2004 | Kraft ................... 715/513 |

OTHER PUBLICATIONS

"Integrating a Command Shell Into a Web Browser", Proceedings of USENIX 2000 Annual Technical Conference, San Diego, CA, Jun. 2000, pp. 171-182.*
He Wei Yang, et al. (2002) Using Human-Machine Dialog to Query Shortcut on the Map, Proceedings of IEEE TenCon'02, pp. 485-488.

* cited by examiner

*Primary Examiner*—Tim T. Vo
*Assistant Examiner*—Jay A Morrison
(74) *Attorney, Agent, or Firm*—Seth H. Ostrow; Ostrow Kaufman & Frankl LLP

(57) ABSTRACT

Systems and methods for enhancing information retrieval and communication functionality through the use of a universal interface that is configurable to interface with multiple applications resident on a user computer, and which provides a persistent two-way communication channel for communicating with search intelligence on a remote system. Sharable, actionable labels and codebooks of labels may be defined by a user. Each label may be defined in a natural language format and may include a mapping to a specific application or set of applications executable on a user system. Transfer of labels and codebooks between user systems allows for enhanced information exchange and retrieval among users as well as information exchange tracking and analysis by a server system.

22 Claims, 7 Drawing Sheets

Yahoo! My Yahoo! Mail

YAHOO! Mail ✉ Welcome, gt
[ Sign Out, My Account ]

✉ Mail ▼  Addresses ▼  Calendar ▼  Notepad

| Check Mail | Compose |

Click here for a chance to win an iPod mini!

Welcome,

✉ You have 8 unread messages:
Inbox (1), Bulk (7)

💡 Today's tip: Going on vacation? Creat an auto-reply message!

PLUS  Yahoo! Mail Plus - New Low Price! Don't wait! For a limited time, you can upgrade to Yahoo! Mail Plus and get more - for less. Learn more Folders (Add)
- Inbox (1)
- Draft
- Sent
- Bulk (7) [Empty]
- Trash [Empty]

☐ Check Your Credit For Free

☐ FREE Sony DVD player- Details

⇨ Make your Y! Mail an SF fax machine!

☐ Best card for bad credit

Search the web [ travel! ] Search — *500*

Mail Home - Help

[Sign Out]

Mail Upgrades - Search Mail - Mail Options

You are using 0% of your 6.0MB limit.

Need more space? Get more storage.

ADVERTISEMENT

| Check Mail | Compose |  Mail Upgrades - Search Mail - Mail Options

Mail - Address Book - Calendar - Notepad

Address Book - Auctions - Autos - Briefcase - Calendar - Chat - Classifieds - Finance - Games - Geocities - Greetings - Groups - Health Horoscopes - HotJobs - Kids - Mail - Maps - Member Directory - Messenger - Mobile - Movies - Music - My Yahoo! - News - PayDirect Personals - Pets - Photos - Shopping - Sports - TV - Travel - Weather - Yellow Pages - more...

*FIG. 6*

Yahoo!  My Yahoo!  Mail  Welcome, gt     [Sign Out, My Account]              Search Home  Help

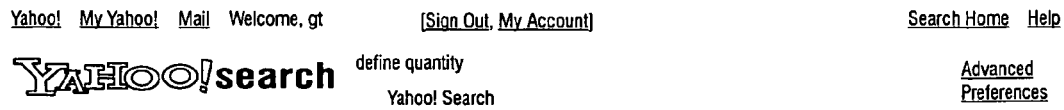  define quantity                                          Advanced
                     Yahoo! Search                                             Preferences Web     Images     Directory     Yellow Pages     News     Products YAHOO! REFERENCE Dictionary Definition quantity:       NOUN: 1a. A specified or
                indefinite number or amount. b.
                A considerable amount or number:
                *sells drugs wholesale and in
                quantity.* c. An exact amount or
                number.
                View Complete Definition in The American Heritage
                Dictionary TOP 20 WEB RESULTS out of about 966,000.  Search took 0.21 seconds.
(What's this?)
  1. http://www.cs.umb.edu/~frivas/CS450/quantities.com
     ...FUNCTIONS;;;;;;;;;;;;;;;;;;;;;;;;;;;;;;;;;;;;;;;;;;;;;;; (define (quantity+
     x y ) (if (not (match-units...y)) (units x)))) (define quantity" x y)
     (make-quantity (" (value...
     www.cs.umb.edu/-frivas/CS450/Quantities.scm - 7k - Cached - More
     pages from this site 2. http://www.cs.cmu.edu/Groups/xavier/include/qlattice.h
     ...VALUE(unbound)) #define QUANTITY_OF_BOUND(bound)
     ((QUANTITY...QUANTITY_LOWER_QBOUND_VALUE(quantity)\
     ((quantityLowerQbound(quantity))->value) #define
     QUANTITY_UPPER_QBOUND_VALUE...
     www.cs.cmu.edu/Groups/xavier/include/qlattice.h - 12k - Cached 3. http://www.cs.umb.edu/~gplante/directory/hw2/quantities.scm
     ...each quantity object contains a tag. (define quantity-tag 'quantity);;
     get-exp returns a units... parameter not a quantity." q))) (define
     (quantity=? q1 q2) (cond ((not (quantity...
     www.cs.umb.edu/~gplante/directory/hw2/quantities.scm - 6k - Cached -
     More pages from this site 4. http://www.dei.isep.ipp.pt/~nsilva/disciplinas/aisc/aisc1999-2000/projecto/software/suplier/s
     hrl
     %
     -------------------------------------------------------------------------
     % INCLUDES...
     www.dei.isep.ipp.pt/~nsilva/disciplinas/aisc/aisc1999-2000/projecto/software/suplier/suplier.hrl
     - 4k - Cached 5. http://www-ksl.stanford.edu/people/brauh/demo/dme-kb/dme-kb.lisp.html
     ...qualitative-parameter ? slot)) (define-functionquantity-slots (?model)
     "mapping from ... eqn)) ;; Quantity ( define-classQuantity ($ quantity)

*FIG. 8*

UNIVERSAL SEARCH INTERFACE SYSTEMS AND METHODS

CROSS-REFERENCES TO RELATED APPLICATIONS

This application is a non-provisional of, and claims priority to, U.S. Provisional Application Ser. No. 60/460,222, filed Apr. 4, 2003, the contents of which are incorporated herein by reference in its entirety.

BACKGROUND OF THE INVENTION

The present invention relates generally to network and Internet search and interface systems and more particularly to search systems that provide enhanced search functionality.

The present invention also relates to interface systems and methods that provide various search functionality and which interoperate with a variety of applications on a user's computer so as to provide a universal information exchange tool.

With the advent of networks such as the Internet and the multitude of web pages and media content available to a user over the World Wide Web (web), there has become a need to provide users with streamlined approaches to filter and obtain desired information from a network or the web. Search systems and processes have been developed to meet the needs of user to obtain desired information. Examples of such technologies can be accessed through Yahoo!, Google and other sites. Typically, a user inputs a query and a search process returns one or more links related to the query. The links returned may be very related, or they may be completely unrelated, to what the user was actually looking for. The "relatedness" of results to the query may be in part a function of the actual query entered as well as the robustness of the search system (underlying collection system) used.

Queries that users enter are typically made up of one or more words. For example, "hawaii" is a query, so is "new york city", and so is "new york city law enforcement". As such, queries as a whole are not integral to the human brain. In other words, human beings do not naturally think in terms of queries. They are an artificial construct imposed on us, in part, by the need to query search engines or look up library catalogs. Human beings do not naturally think in terms of just single words either. What human beings think in terms of are natural concepts. For example, "hawaii" and "new york city" are vastly different queries in terms of length as measured by number of words but they share one important characteristic: they are both made up of one concept each. The query "new york city law enforcement" is different, however, because it is made up of two distinct concepts "new york city" and "law enforcement". Human beings by nature build queries by entering one or more natural concepts, not simply a variably long sequence of single words.

Current technologies at any of the major search providers, e.g., MSN, Google or any other major search engine site, do not understand queries the same way that human beings create them. This is perhaps the most important reason that prevents search providers from understanding user intent and providing optimal search results and content.

As can be seen there is a need for improved search and interface technology that provides results that are more in line with the actual concepts in which a user may be interested.

BRIEF SUMMARY OF THE INVENTION

The present invention provides systems and method for enhancing search functionality provided to a user. The present invention provides systems and methods for enhancing information retrieval and communication functionality through the use of a universal interface that, in certain aspects, is configurable to interface with multiple applications resident on a users computer, and which provides a persistent two-way communication channel for communicating with search intelligence on a remote system. In certain aspects, the present invention automatically decomposes queries into constituent units that are related to concepts in which a user may be interested.

The present invention also provides systems and methods for creating, storing and leveraging user-defined and pre-defined labels, codes and parameters that map to specific referents. For example, a user may create a label or code that specifies an action to take, such as accessing one or more applications, whenever the label or code is entered. Such a label or code may include an argument that is intended to be processed according to the underlying label or code mapping. When entered by a user, e.g., in the universal interface, the system uses the label or code as a key to a mapping table to identify what action to take or how to process the argument, if any. In certain aspects, such labels, codes, parameters, etc. may be created by users as natural language constructs, which simplifies user understanding of the label, code, etc. Such labels, codes, etc. may be transferred to, and used by, other users and systems. A recipient of such a label or code may change the referent or the label name or other properties of the label, code, etc.

According to an aspect of the present invention, a computer implemented method is provided for processing a user input to determine an action to be taken based on the content of the user input in a client system. The method typically includes displaying a dialog box on a graphical user interface display associated with the client system, receiving a user input into the dialog box, and processing the content of the user input to determine an action to take based on the user input content. In certain aspects, the action includes one of performing a search using the user input as a search query and accessing one or more applications residing on the client system to perform further processing based on the content.

According to another aspect of the present invention, a method is provided for sharing actionable labels between a plurality of client systems. The method typically includes creating a first label on a first client system, the label including a mapping to at least one specific application executable on the first client system, transferring the label to a second client system over a network, and storing the first label to a memory unit of the second client system. The method also typically includes processing user input on the second client system, and if the user input identifies the first label, invoking the at least one specific application on the second system, and processing the user input using the at least one specific application.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

BRIEF DESCRIPTION OF THE DRAWINGS

FIG. 6 illustrates an example of a GUI display page including a universal dialog box (UDB) according to one embodiment.

FIGS. 7 and 8 illustrate examples of web pages provided to a client system using the functionality provided by the UDB interface system and methodologies of the present invention.

DETAILED DESCRIPTION OF THE INVENTION

Figure 1:
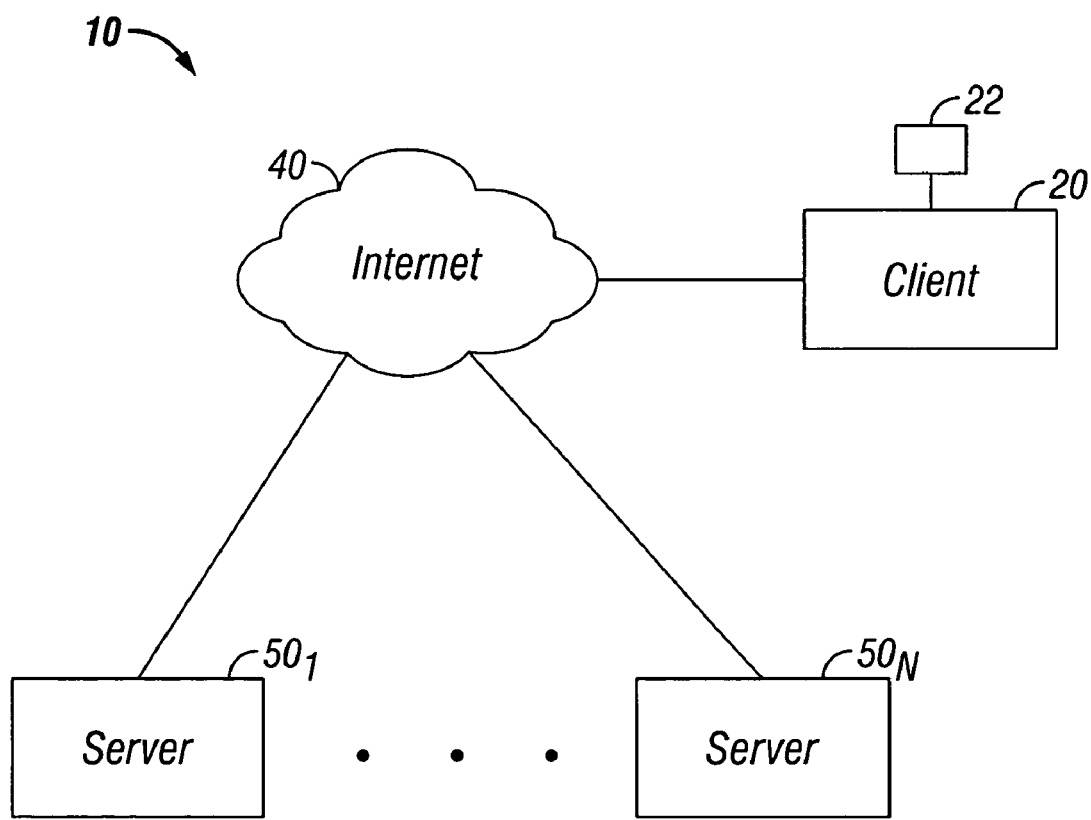
FIG. 1 illustrates a general overview of an information retrieval and communication system according to an embodiment of the present invention.

FIG. 1 illustrates a general overview of an information retrieval and communication network 10 including a client system 20 according to an embodiment of the present invention. In computer network 10, client system 20 is coupled through the Internet 40, or other communication network, e.g., over any LAN or WAN connection, to server systems $50_1$ to $50_N$. As will be described herein, client system 20 is configured according to the present invention to communicate with any of server systems $50_1$ to $50_N$, e.g., to access, receive, retrieve and display media content and other information such as web pages.

Several elements in the system shown in FIG. 1 include conventional, well-known elements that need not be explained in detail here. For example, client system 20 could include a desktop personal computer, workstation, laptop, PDA, cell phone, or any WAP-enabled device or any other computing device capable of interfacing directly or indirectly to the Internet. Client system 20 typically runs a browsing program, such as Microsoft's Internet Explorer™ browser, Netscape Navigator™ browser, Mozilla™ browser, Opera browser, or a WAP enabled browser in the case of a cell phone, PDA or other wireless device, or the like, allowing a user of client system 20 to access, process and view information and pages available to it from server systems $50_1$ to $50_N$ over Internet 40. Client system 20 also typically includes one or more user interface devices 22, such as a keyboard, a mouse, touchscreen, pen or the like, for interacting with a graphical user interface (GUI) provided by the browser on a display (e.g., monitor screen, LCD display, etc.), in conjunction with pages, forms and other information provided by server systems $50_1$ to $50_N$ or other servers. The present invention is suitable for use with the Internet, which refers to a specific global internetwork of networks. However, it should be understood that other networks can be used instead of or in addition to the Internet, such as an intranet, an extranet, a virtual private network (VPN), a non-TCP/IP based network, any LAN or WAN or the like.

According to one embodiment, client system 20 and all of its components are operator configurable using an application including computer code run using a central processing unit such as an Intel Pentium™ processor, AMD Athlon™ processor, or the like or multiple processors. Computer code for operating and configuring client system 20 to communicate, process and display data and media content as described herein is preferably downloaded and stored on a hard disk, but the entire program code, or portions thereof, may also be stored in any other volatile or non-volatile memory medium or device as is well known, such as a ROM or RAM, or provided on any media capable of storing program code, such as a compact disk (CD) medium, a digital versatile disk (DVD) medium, a floppy disk, and the like. Additionally, the entire program code, or portions thereof, may be transmitted and downloaded from a software source, e.g., from one of server systems $50_1$ to $50_N$ to client system 20 over the Internet as is well known, or transmitted over any other conventional network connection as is well known (e.g., extranet, VPN, LAN, etc.) using any communication medium and protocols (e.g., TCP/IP, HTTP, HTTPS, Ethernet, etc.) as are well known. It will also be appreciated that computer code for implementing aspects of the present invention can be implemented in C, C+, HTML, XML, Java, JavaScript, any scripting language, such as VBScript, or any programming language that can be executed on a client system. In some embodiments, no code is downloaded to client system 20, and the necessary code is executed by a server, or code already present at client system 20 is executed.

Figure 2:
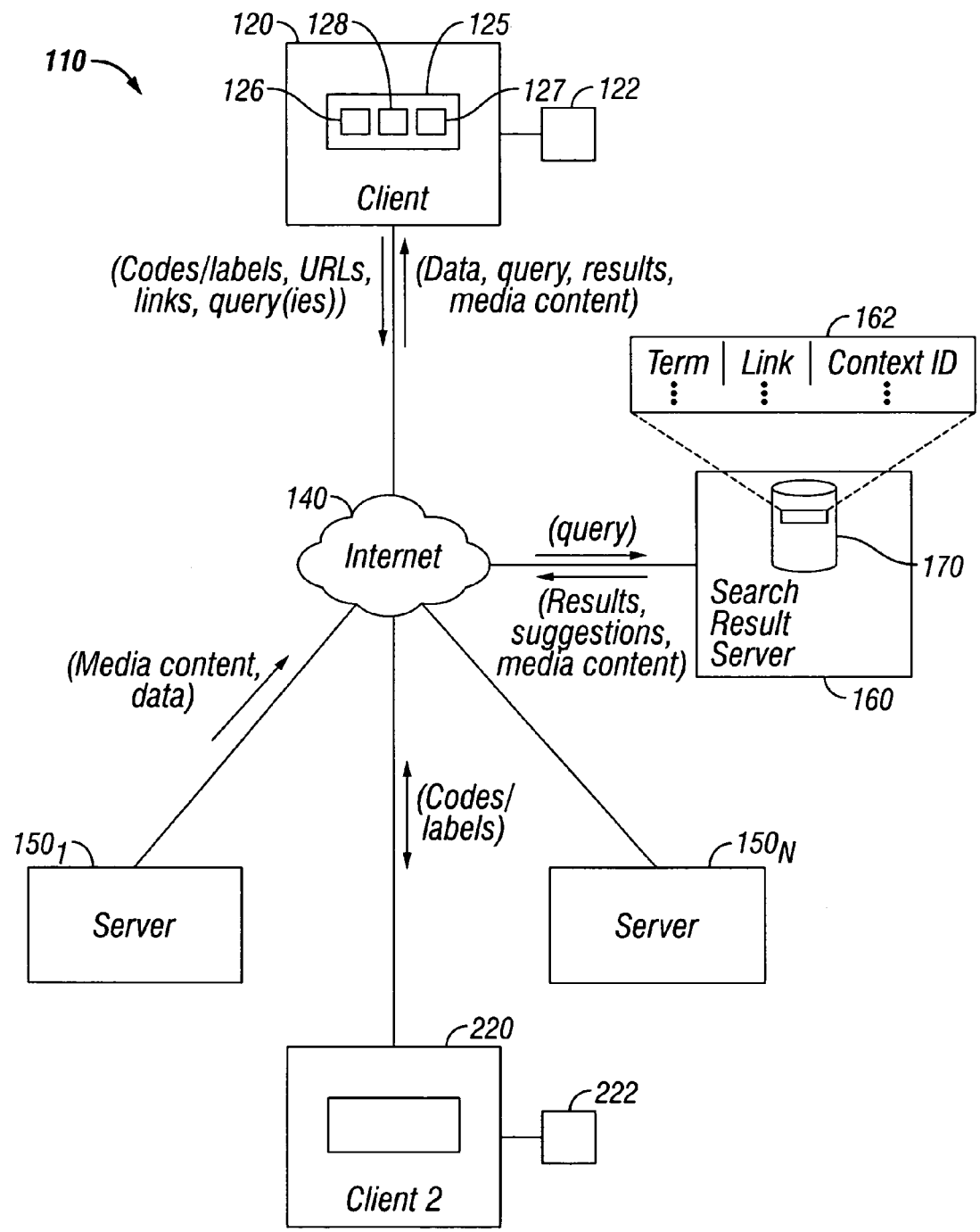
FIG. 2 illustrates an information retrieval and communication network for communicating media content according to an embodiment of the invention.

FIG. 2 illustrates another information retrieval and communication network 110 for communicating media content according to an embodiment of the invention. As shown, network 110 includes client system 120, server systems 150 and server system 160. In network 110, client system 120 is communicably coupled through Internet 140 or other communication network to server systems 150 and 160. As discussed above, client system 120 and its components are configured to communicate with server systems 150 and 160 and other server systems over the Internet 140 or other communication networks.

According to one embodiment, a client application (represented as module 125) executing on client system 120 includes instructions for controlling client system 120 and its components to communicate with server systems 150 and 160 and to process and display data content received therefrom as is described herein. Client application 125 is preferably transmitted and downloaded to client system 120 from a software source such as a remote server system (e.g., server systems 150, server system 160 or other remote server system), although client application module 125 can be provided on any software storage medium such as a floppy disk, CD, DVD, etc., as discussed above. For example, in one aspect, client application module 125 may be provided over the Internet 140 to client system 120 in an HTML wrapper including various controls such as, for example, embedded JavaScript or Active X controls, for manipulating data and rendering data in the various objects, frames and windows as will be described later.

Additionally, client application module 125 includes various software modules for processing data and media content. For example, application module 125 might include one or more of a search module 126 for processing search requests and search result data, a user interface module 127 for rendering data and media content in text and data frames and active windows, e.g., browser windows and dialog boxes, and an application interface module 128 for interfacing and communicating with various applications executing on client 120.

Examples of various applications executing on client system 120 for which application interface module 128 is preferably configured to interface with according to aspects of the present invention include various e-mail applications, instant messaging (IM) applications, browser applications, document management applications, database applications and others. Further, user interface module 127 may include a browser, such as a default browser configured on client system 120 or a different browser. As one example, a client application module 125 according to one embodiment can be downloaded from Yahoo! Inc. using the URL: http://help.yahoo.com/help/us/sbc/browser/.

Referring to FIG. 2, according to one embodiment, server system 160 is configured to provide search result data and media content to client system 120, and server system 150 is configured to provide data and media content such as web pages to client system 120, for example, in response to links selected in search result pages provided by server system 160. As will be described in more detail below, server system 160 in one embodiment references various collection technologies for populating one or more indexes with, for example pages, links to pages, etc. Such collection technologies include automatic web crawlers, spiders, etc., as well as manual or semi-automatic classification algorithms and interfaces for classifying and ranking web pages within a hierarchical structure. In certain aspects, server 160 is also configured with search related algorithms for processing and ranking web pages, such as for example, the PageRank algorithm from Google. Server 160 is also preferably configured to record user query activity in the form of query log files.

Server system 160 is configured to provide data responsive to various search requests received from a client system, in particular search module 126. Server systems 150 and 160 may be part of a single organization, e.g., a distributed server system such as that provided to users by Yahoo! Inc., or they may be part of disparate organizations. Server system 150 and server system 160 each includes at least one server and an associated database system, and may include multiple servers and associated database systems, and although shown as a single block, may be geographically distributed. For example, all servers of server system 160 may be located in close proximity to one another (e.g., in a server farm located in a single building or campus), or they may be distributed at locations remote from one another (e.g., one or more servers located in city A and one or more servers located in city B). As used herein, the term "server system" will typically include one or more logically and/or physically connected servers distributed locally or across one or more geographic locations. Additionally, the term "server" will typically include a computer system and an associated storage system and database application as is well known in the art.

According to one embodiment, server 160 is configured with one or more page indexes and algorithms for providing search results to users in response to search queries received from client systems 120. In certain aspects, server system 160 is additionally configured to provide novel, enhanced search query analysis and categorization functionality in response to search requests from client system 120.

In one embodiment, for example, processes executing on server 160 perform contextual analysis of search queries and/or search results and respond with search results grouped in contexts. Many search terms may have different meanings depending on the context intended. For example, if a user performs a search using the term "Java", the intended context is not clear. The user may be interested in the Java computer language, in the Indonesian Island, Java, or in coffee which is often colloquially referred to as java. Thus different words may have different word senses and contexts. The present invention advantageously analyzes search queries and/or results and groups results in contexts for display at the user's computer 120. For example, in the above example for the search term "Java", server 160 returns search results grouped into three (or more if other contexts are identified) contexts or word senses: Java for the computer language, Java the island and coffee java. The system may be configured to display the results in sets with links provided in association with each context, or the system may display just the contexts (with enough information to distinguish the contexts to the user) without any links and allow the user to select the desired context to display the associated links. In the Yahoo! network system, for example, a set of contexts might be displayed with each context having a set of links to pages from the search index, links associated with sponsored matches, links associated with directory matches and links associated with Inside Yahoo! (IY) matches.

In addition to words or phrases having ambiguous meanings, such as "Java", the system of the present invention is configured in one embodiment to group results into contexts for search terms that are not necessarily ambiguous. One example is the results returned for the search term "Hawaii". The term "Hawaii" in and of itself might not be ambiguous, however, the character of the results returned for such a term could be very broad, related to literally everything discussing or mentioning "Hawaii". To provide more useful results to the user, the system of the present invention preferably organizes search results into contexts by leveraging the knowledge of what the results are actually related to. For example, for Hawaii, the system may return results in various context groupings such as "Hawaii: travel", Hawaii: climate", "Hawaii: geography", "Hawaii: culture", etc. For example, in certain aspects, context identifiers are stored in association with page links in the index, so that when a search is performed links can be grouped according to the identifiers. A page link may be associated with multiple context identifiers. Such identifiers are preferably automatically associated with links by the system as users perform related searches, however, the identifiers may also be modified and associated with links manually by a team of one or more administrators. In this manner, knowledge gleaned from numerous searches is fed back into the system to define and re-define contexts to make the displayed search results more valuable and useful to the requesting user.

In one embodiment, processes executing on server 160 perform concept discovery and concept analysis of search terms to provide more meaningful results to the user. For example, for the search phrase "New York City" it is fairly clear that the user is interested in sites related to New York City (the city or region) as opposed to a city in New York (state). Similarly, for "New York City law enforcement" it is clear that the user is interested in sites related to law enforcement (e.g., segment of jobs) in New York City. However, most search engines would simply search using the individual terms "New", "York", "City", "law" and "enforcement" regardless of the order of the terms as used in the search phrase. The present invention advantageously analyzes terms in the search phrase to identify one or more concepts that make up the search query. In preferred aspects, the system uses the order that search terms are presented to identify concepts and categorize search results. For example, using "New York City law enforcement" as the search phrase, the system identifies, e.g., by hashing, "New York City" and "law enforcement" as two concepts in the search phrase and returns results for the two concepts. The same results would be returned for "law enforcement in New York City". However, for "city law enforcement in New York", different results would be returned based on the concepts "law enforcement" and "New York" and "city", or "city law enforcement" and "New York". Likewise, "enforcement of law in New York City" would be identified as including the concepts "New York City", "law" and "enforcement" Thus, order of concepts is not so important as the order of terms that make up a concept. In preferred aspects, concepts are included in the page index or a separate concept index may be implemented. It should be noted that "law enforcement" could be regarded as the same as "enforcement of law" or not depending on the context.

In preferred aspects of the present invention, a query processing engine is provided to process queries and decompose queries into constituent units. The query processing engine of the present invention allows for the system to implement concept discovery and analysis processes as well as context analysis, disambiguation and many other processes that would enhance the quality of results returned to a user in response to a search query. A query processing engine according to the present invention may be implemented in a stand alone device or system connected to a network, e.g., a computer system executing various query processing and analysis algorithms and processes as discussed herein, or it may be included as part of a search server such as server system 160, or other server system.

Figure 3:
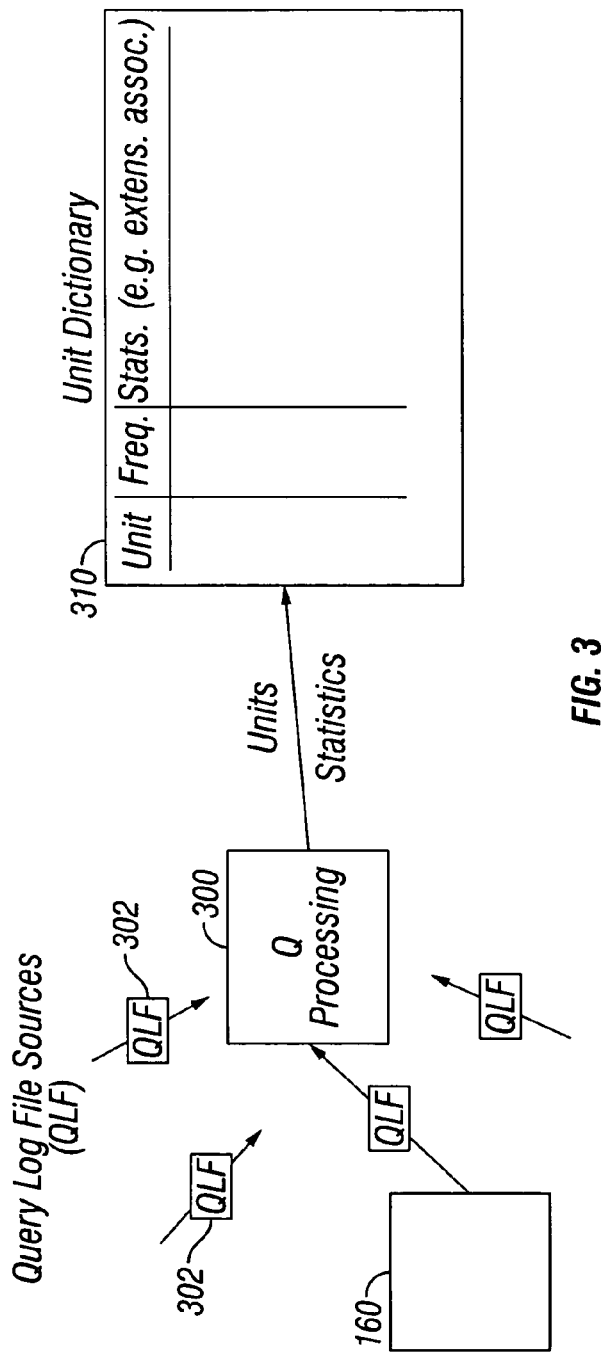
FIG. 3 illustrates a system including a query processing engine configured to process query log files to populate a unit dictionary according to an embodiment of the present invention.

FIG. 3 illustrates a system including a query processing engine according to an embodiment of the present invention. A shown engine 300 receives query log files (or actual queries) from various sources over the Internet or through various network connections, e.g., LAN, WAN, direct links, distribution media (e.g., CD, DVD, floppy), etc. Examples of sources include search server 160 (FIG. 1), or multiple search servers 160 in a distributed network of search servers, and one or more of servers 150. Query log file sources are typically associated with the same organization or entity, e.g., Yahoo! servers, but need not be. The query log files (query logs) are processed by query engine 300 using statistical methods such as may be used in information theory or concepts such as mutual information. In preferred aspects, daily query logs are used, although logs for different time periods, e.g., hours, weeks, etc. may be used as desired. Query logs typically include actual queries submitted by users, and in some cases additional useful information such as geographic location of querying users, timestamps, IP addresses of client systems, cookies, type of client (e.g., browser type), etc. Query processing engine 300 processes the various query logs and generates units therefrom. The units, and associated statistics such as frequency of occurrence are stored to a memory or database file 310.

Examples of aspects of a query processing engine including methodologies for processing queries and query logs to generate units, and for generating suggestions based on units, is described in U.S. patent application Ser. No. 10/713,576, filed on Nov. 12, 2003, titled "SYSTEMS AND METHODS FOR GENERATING CONCEPT UNITS FROM SEARCH QUERIES", the contents of which are hereby incorporated by reference in its entirety.

Figure 4:
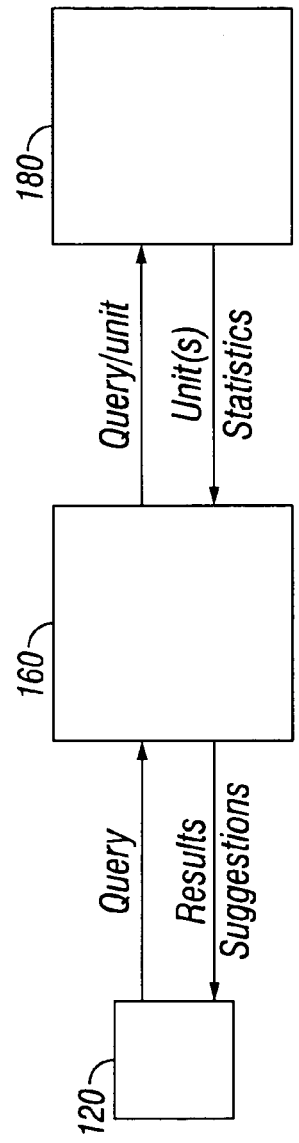
FIG. 4 illustrates a system including a Unit Dictionary and associated processing intelligence, including a query processing engine in some aspects, according to an embodiment of the present invention.

In certain aspects, query processing engine 300 may be implemented in server system 160. For example, software for implementing query processing, unit decomposition, unit dictionary population and statistical analysis might execute on server system 160 in addition to search response processes that interface with users and page index 165. In other aspects, query processing engine 300 executes in a separate system such as shown in FIG. 4. In response to a query from a user system 120, server system communicates the query to system 180 requesting that units and statistics be returned. Server 160 processes the units and any statistics received from system 180 and returns results responsive to the user's query to the user along with suggestions and other information. In certain aspects, suggestions are a way to involve users in a continuous dialogue with the search system. Suggestions are hints and tips about what the user might want to explore next based on highly sophisticated understanding of user needs as captured in units and their extensions and associations.

In one aspect, the unit dictionary 310 is advantageously used to generate suggestions to present to the user in addition to, or in lieu of, actual search results. For example, search server 160 or other search intelligence may send a query to a specialized server, e.g., server 180 of FIG. 4, controlling the unit dictionary, or an instance of the unit dictionary may be stored to search server 160. An example of a methodology for generating suggestions according to one embodiment, for example using extensions and associations defined in the above pseudo-code for generating units, can be found in U.S. patent application Ser. No. 10/713,576, filed on Nov. 12, 2003, entitled "SYSTEMS AND METHODS FOR GENERATING CONCEPT UNITS FROM SEARCH QUERIES", previously incorporated by reference.

According to certain aspects, the present invention exposes search options more clearly and in a manner that is more useful than prior systems. In one embodiment, for example, the user is able to search within a linked site. For example, in response to a search for "Compaq computers" the user may be provided with search results including, inter alia, various links to sellers of Compaq computers. According to the present invention, the user is provided with the ability to search directly within a linked site. For example, the user can enter another search term(s), e.g., "laptops", in a dialog box and select a site, and responsive thereto a search is performed within the selected site using the new search term(s). The system is preferably configured to interface with the search functionality provided by the linked site, if any, or to perform a search within the site autonomously if no search functionality is provided by the linked site. Results returned include links to one or more pages within the site, or the result may be the result page provided by the search functionality associated with the page. For example, if the selected linked site happened to be Amazon.com, the system would automatically access the search functionality provided by the Amazon.com site and insert the search term(s) as appropriate for the search form(s) provided.

In another embodiment, the user is provided with the ability to perform in situ searches or "sideways" searches of similar or related sites. For example, suppose a user is interested about information for a flight or flights from point A to point B on day W. The user may directly access an airline site, e.g., an American Airlines site, and perform the search within that site, or the user may request a search for "airlines" or "air travel" or "American airlines" or the like, access a specific site from a link in the search results displayed, e.g., the American Airlines site, and request information about a flight or flights from point A to point B on day W within the accessed site. The user is now viewing information from American Airline's site about the requested information, including perhaps pricing information related to the various flights available. Using the present invention, the user is advantageously able to search another site using the same information, e.g., points A and B and day W, to obtain similar results without having to manually access the new site and re-enter the desired information. According to one aspect of the present invention, the user performs a sideways search, for example, by entering a command, e.g., "$.United" or "$.Unitedairlines.com" or something similar, in a dialog box, such as the universal dialog box as will be discussed in more detail below, to perform the same search at the United Airlines site, or by selecting a link in the search results page, e.g., United Airlines link, in a special way such as with a right click or after selecting a "sideways search" icon. The system interfaces with the identified site to provide the desired search results, for example, a page at the identified site listing pricing information for flights from point A to point B on day W. In cases where the user has directly accessed a site and entered search information into a form associated with the accessed site, the search module 126 stores this input information and uses such information where necessary for filling out forms in the related sites when a sideways search is requested. The user may, of course, need to enter additional information at a new site depending on the requirements of the selected site. In this manner the user is provided with the ability to streamline similar searches across different websites for similar information.

In certain aspects, almost the entire content that appears on the page is "modifiable" by the user. For example, in certain aspects, the entire content appears like a form with pre-filled entries (e.g., in text boxes, drop-down boxes, etc.) for all the things that the user might want to change. So, there could be option to change the name of the airline, the travel dates, the price (implying "find me something that costs less than amount entered", for example), the seat assigned, the travel destinations, the flight, and so on. In one aspect, a user may modify any anchor text or page link on a page and turn it into a user-defined code or label. For example, a user might select a link to a mail page such as Yahoo! Mail and use it as a label or code. The user might then change the name of the reference to, for example, "Mail 1". In this case, each time the system is told to display a link to Yahoo! Mail (e.g., as part of an HTML page) the system replaces the link with a link identifying "Mail 1", the selection of which would still access the users Yahoo! Mail account. Similarly, the user could choose to change the referent of the "Mail 1" label to refer to a different e-mail account (or any other referent for that matter), such as a Hotmail account. The system would store a mapping of this code or label and the mapping would indicate that the identified referent should be accessed each time the user enters this label or selects the displayed link representing the label.

In other aspects, the system is configured to establish real-time communication links with company sites or servers to provide dynamic information related to search results without controlling the index. For example, in one embodiment, server 160 establishes a communication link with a server 150$_{N-2}$ of a subscribing company in real-time or periodically, e.g., every few hours, to obtain annotations, fresh summaries, updates, promotions or other information for pages and products referenced by the index. If, for example, a user performs a search for laptop computers, many, many results (e.g., links) may be returned and displayed. The results may include links to numerous vendors and resellers of laptop computers. In one embodiment, the present invention provides a subscribing company, such as a vendor company (e.g, Compaq or Sony), the ability to provide dynamic information that can be displayed on the search result page(s). The information may include annotations, summaries, promotions, etc., related to what the user is searching for, in this example laptop computers made or sold by the subscribing company and others. The information may be displayed with no apparent relation to the result links displayed, or it may be displayed proximal links to pages at the company's site or related sites, for example.

In preferred aspects, processes configured to run on subscribing companies' servers, e.g., servers 150, are provided to subscribing companies (e.g., as code on a computer readable medium or transmitted over a network connection) for communicating with server 160. Such processes are preferably always running in the background, providing desired information in response to queries from server 160 identifying pages and or products referenced by the index or as a result of individual searches. Manual information updating may also be implemented, wherein an operator at the company provides the desired information at specified times or upon request from server 160.

In certain aspects, an auction function is implemented by server 160 with such subscribing companies. For example, when a user enters a search request, such as for "laptop computers", server 160 performs a search in the index and identifies page links from the index to be provided to the user. If multiple subscribing companies are referenced by the results, they are allowed to bid in real-time for preferential placement, e.g., preferential placement of links on a result page or preferential placement of promotions or other information. In preferred aspects, such auction and dynamic updating functionality is implemented without altering the index. For example, when a user enters a search, results are determined using the index to identify links and other information to be returned to the user without any deference to sites that are associated with subscribing companies or entities. Subscribing companies or entities that are impacted by the determined search results (e.g., entities having related links in the search results) are provided with the ability to enter an auction or update information and have information displayed on search result pages. Auction bids and dynamic update information may be provided before a search is performed, however, such does not effect the index search. For example, a subscriber may place a bid or enter update information associated with particular search term or terms in the index. The bids and update information are bound to or integrated with the index (e.g., stored in association with index entries in a logical row using pointers), and are only used when search results have been identified. The system then determines order of priority based on any bound auction bids related to the search results.

In certain aspects, auction strategies that different sites use take into account who the user is. For example, certain users are more beneficial to certain sites, so they may be keener to attract them over others. In other aspects, the auction process goes through multiple iterations. For example, after the initial round is over, various competitors may reassess their bids in light of what others have done, and change their bids.

In certain aspects, a single entry search box for entering actionable information such as URL's, search requests, look-ups, updates, links, and so on is provided. The entry box is preferably made available prominently across the entire network. As used herein, the entry box will be referred to as a search box or a universal dialog box (UDB). The universal dialog box is provided with a default size and location, however, the user may reconfigure the size and location as desired. For example, a user can request a larger version of the box so that they can, for example, enter several queries at once, or otherwise enter a large amount of actionable information. Also, a user may designate that the box be included as a toolbar or presented on a web page, as a thin window on the side of a browser window, or as a separate pane.

Users can enter information such as a single search request term or several requests/searches simultaneously (e.g., using full, coded, or partially coded formats). Multiple URL's, queries, links to be followed, etc. can also be entered simultaneously. Results may be displayed one after the other, e.g., in spatial/temporal order, or otherwise organized within the same or multiple pages. Using the universal dialog box, a user can enter any and all of his/her needs. The result —no matter what is involved in its generation—also preferably appears in a uniform interface. In certain aspects, the semantics of the content and the context determine what operations should be applied, and therefore also what application(s) should be invoked, as will be described below.

The present invention therefore provides a simple yet unique way to capture the mindshare of users as well as reap the benefits of obtaining access to tons of high-quality, user behavior data. Another way to think about this is that passive information is being made actionable. Today, a user can set up a web page and list their favorite search engines, or create bookmarks, or write an e-mail about them, or post about them, or write a web log about them. All of these are passive and disparate objects. That content just sits there. In contrast, the present invention provides a system and method for users to build active information, information that can be actioned by anyone who chooses to do so.

To date, efforts to convert passive information to actionable information have not succeeded in part because of how and in what format content is usually produced. Lots of information is only placed in running text and no natural language understanding systems are yet good enough to "understand" running text well enough to be able to make the content actionable. The present invention provides an approach of bringing in natural language understanding into the equation to assist with understanding individual queries and phrases both of which are done automatically.

In certain aspects, the present invention also provides shortcut functionality to a user. In one embodiment, for example, the universal dialog box application, e.g., interface module 128, is configured to interface with multiple applications executing on computer system 120. The user is presented with a display including a dialog box within which the user may enter various parameters depending on the functionality desired. In certain aspects, the dialog box is configured to perform various functions based on the type of parameter entered. For example, if a user enters a URL, the dialog box interface, e.g., interface module 128, identifies that the parameter entered is a URL and preferably calls a browser application and establishes a connection with the site identified by the URL. If the user enters a simple term or phrase, for example, the interface module 128 accesses search module 126 to perform a search for the term entered. If, for example, enters a "get mail" command, interface module accesses an e-mail application, or multiple e-mail applications, configured on system 120 to retrieve incoming e-mail messages, or preferably a list of incoming e-mail messages. If, for example, the user enters a "send mail" command followed by a text message and/or an indication of an attachment, the interface module accesses an e-mail application to send out the message. If an attachment is identified, a file system, document management application or other application, e.g., MS Word for Word attachments, is accessed to retrieve the identified attachment. Similarly, for instant messaging (IM) applications, parameters may be entered to identify to interface module 128 that an instant messaging application should be accessed.

Interface module 128 is preferably configurable to interface with any number of applications resident on system 120. In one embodiment, the action that interface module 128 takes is determined by the type of parameter entered. For example, pre-configured parameter types such as URLs and simple text phrases can be used, as well as more advanced parameter types, such as for example pre-configured command parameters "get mail" and "send mail:" or "send IM:" and the like may be implemented. Further, according to one aspect, user-configurable parameters are used. For example, the user may define a certain parameter as an identifier of a certain application to be accessed and/or a certain action to be taken. An example may be "update.calendar[date.time.description]" or simply "calendar[d.t.desc]", or whatever the user desires using any suitable format or syntax. Such a parameter would identify to interface module 128 that the calendar application, e.g., Microsoft Outlook™, Yahoo! Calendar, or other application, should be updated with the description on the date and time entered. A user may also define a parameter that links to multiple applications. An example would be something like "calendar.send [date, time, desc., recipientlist]" which would identify that the calendar application, e.g., Microsoft Outlook™, Yahoo! Calendar, or other application, should be updated with the description on the date and time entered, and that the same information should be e-mailed using an e-mail application, e.g., MS Outlook™, Yahoo! Mail, or other e-mail application, to the identified recipient(s). The e-mail application would be accessed, addresses determined and the information sent. Other parameters or labels may be created to identify specific sites within a network, for example a specific site on the Internet or a private network. An example would be a label "Amazon(argument)" which when used identifies the Amazon.com website to interface module 128, which performs a search for "argument" within the amazon.com website and returns the result page from Amazon.com to the user. In preferred aspects, a shortcut wizard or tool is provided that allows the user to define a parameter, link it to an application or applications and store it to memory for later use.

Figure 5:
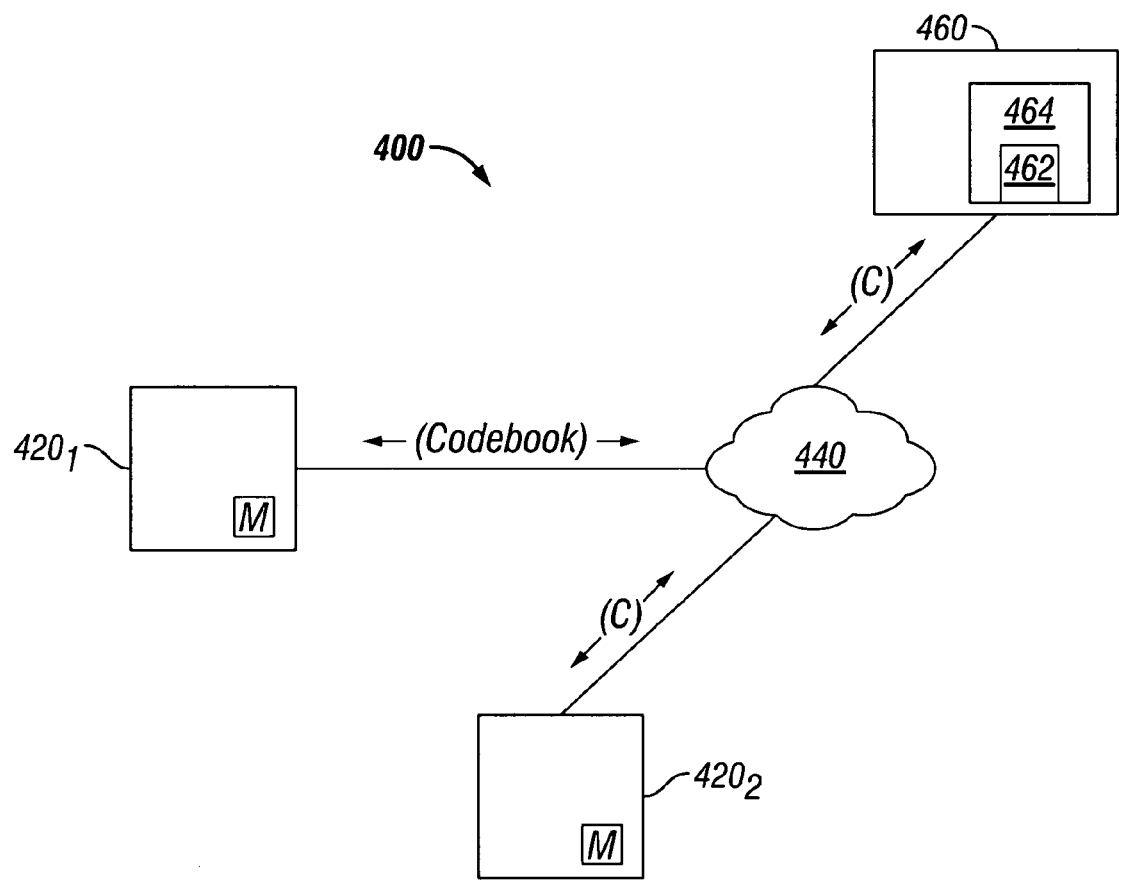
FIG. 5 illustrates an example of the transfer, storage and retrieval of codes, labels and parameters according to one embodiment.

In certain aspects, a table or other data structure is maintained in the system for storing mappings between pre-defined and specific user designated parameters, labels and commands and the corresponding application or function they are associated with. The table may be accessed by interface module 128 to retrieve mappings, to store new mappings and also to transfer mappings to other systems and users. FIG. 5 illustrates an example of a system 400 implementing the transfer, storage and retrieval of codes, labels and parameters. As shown, client systems 420 are communicably coupled to each other and to server system 460 over a network 460 such as the Internet. Server system 460, in one aspect stores a set 462 of pre-defined codes, labels and/or parameters for use by any users. Any user defined codes, parameters, labels are stored to a memory 464 along with the predefined set 462. For example, the custom sets created by users may be stored in one or more separate mapping tables or they may be joined into a larger table along with some or all of the pre-defined set 462. Codebooks stored on client systems 420 are typically stored in a memory module as is well known, such as a RAM, ROM, hard drive or portable medium (e.g., CD, DVD, etc.). FIG. 400 also shows codebooks (represented as "(C)") being retrieved and transferred by and between client systems 420 and server system 460. Each codebook may include a single mapping, e.g., a single code, label or parameter, or it may include multiple mappings. In preferred aspects, codebooks are objects that may be transferred, requested, sent, accessed, etc. using well known protocols and techniques such as HTTP, FTP, DMA, etc.

In preferred aspects, the universal dialog box provides a two-way persistent communication channel between the user, e.g., system 120, and the server system 160. Further, the universal dialog box is preferably prominently displayed to the user on various web pages so that the user has it available regardless of what the user's browser is displaying. For example, the universal dialog box is preferably always displayed to the user no matter what application a user may be using or, if accessing a network no matter what page or site in the network the user is currently accessing. In this manner, the search and interface functionality of the dialog box, as well as the intelligence of server 160 is always provided to the user. Alternatively, the universal dialog box can be provided in a toolbar that remains normally present. FIG. 6 illustrates an example of a GUI display page including a UDB 500 according to one embodiment. As shown, UDB 500 provides an input interface for receiving user input, e.g., using an interface device such as a keyboard, mouse, etc. The specific GUI display page shown in FIG. 6 represents a Yahoo! Mail user page served by a mail server within the Yahoo! system.

In certain aspects, processes running on server 160 can track activity by the user when using the dialog box to optimize information transfer for the user. For example, server 160 is configured to anticipate user search requests based on current and past activity, or leverage past information regarding information transfer to and from the user to optimize future data transfer. An example of the latter is one user sending an e-mail from system 120 to a second user at system 220. Server 160 can track activity of the second user through the persistent two-way channel of the second user and identify that the second user typically prefers to receive communications via IM applications as opposed to e-mail. Server 160 can be configured to communicate this information to the first user, or server 160 can act as an intermediary and convert the e-mail message into an instant message using the preferred IM application of the second user. Similarly, interface module 128 on a user system can be configured to communicate and convert information and messages solely, or in collaboration with server 160. Alternatively, the interface module 128 and/or server 160 may take action based on the situation, what the context of the communication is, and/or the context of a message. That is, a user may desire that short messages be delivered by instant messaging, but that longer messages be delivered by e-mail, or a user may decide that message from a certain user, or message on a specific subject or subjects be delivered by a certain means. Server 160 and/or module 128 can take appropriate action based on such user-configured actions or based on patterns of use by a user (user may override).

User defined parameters and labels are preferably interchangeable. For example, a user at system 120 may provide a parameter or label, or a set of parameters or labels in a personal codebook to a second user at system 220. The underlying code (e.g., table/data structure holding the mappings) linking the parameter with the various application(s) may also be transferred. Transfer of a single label or parameter or a codebook may be done directly, such as by sending a file, or transfer may be effectuated by using a parameter or label in a communication, e.g., e-mail or IM. A second user receiving a label or parameter in a communication would access the parameter or label, e.g., by clicking on it much like with a URL in a message. Selection of the label or parameter or codebook would also preferably effectuate a transfer of the underlying linkage code to the second user, with options to accept and store, modify (e.g., to change a link or reference from one application to a different application), etc. Sharing of personal labels in this manner greatly enhances communication of information between users. For example, a shared label referencing to a first users "favorite movie of the week" would change each week. Rather than having to re-communicate such information to the second user on a periodic basis, the first user could just modify the reference to link to a different movie. When accessed or selected by the second user, interface module 128 would access the updated reference, e.g., through server 160, and display the updated information on the (second) user's system.

The following section lists various advantages, features, aspects and uses of the Uniform Dialog Box, Codes and labels, inter alia, according to various aspects and embodiments of the present invention.

The universal dialog box, in certain aspects, provides a mechanism for users to immediately obtain information that could be buried deep anywhere on a network or elsewhere. For example, some users maintain their calendars online. With the present invention, a user could type in a simple phrase such as "my cal next" to get their next appointment, or "my cal today" to get today's appointments, and so on. They can even update their calendar. For example, "my cal update David Tue 10 am" would appropriately place this appointment into their calendar. There is no need for the user to go to their calendar for such simple operations. Likewise, they could find out how much their stock portfolio is worth at the moment by just typing a simple phrase such as "my portfolio". Users can also update entries in their "my Yahoo!" page in the same way. So, for example, they can find the cheapest ticket to fly from where they live to Chicago next Tuesday by entering a (coded) phrase such as "$. Chicago next Tuesday" where $. refers to the home airport of the person.

The universal dialog box, in certain aspects is similar to a shell prompt or a lisp interpreter prompt providing users the ability to do all sorts of things right there. For example, they can make arithmetic calculations: 5543+343*321=will generate the correct result. Users can do currency conversion: A$40=US? They can do time zone conversion. They can find out what time it is anywhere in the world. Given a phone number—domestic or international—they can find out what the local time there is and what could be the best time to call there. In certain aspects, the present invention also supports all sorts of precise answers to precise questions. For example, some of this could be in Prolog style: Population of Argentina is ?. So, a user can ask a True/False question. "The population of Argentina is at least 60 million". Likewise "movie times for xyz" and just those times are returned. "What if" queries may also be offered. So, for example, a user can ask what their stock portfolio will look like should YHOO shoot up to 50.

Users can create and save simple formulae. A large library of pre-existing formulae is provided in certain aspects. For example, a user can enter the formula to compute compound interest. Then, to compute the compounded value of their capital in a particular situation they just need to indicate the starting capital, interest rate, and period of time.

Customization and personalization provided by the UDB are a key to making this a robust system. RealNames and AOL shortcuts and so on have been around for years but met mixed success. The present invention, in certain aspects, is the opposite of these systems; users control how they want to refer to whatever they want to refer to. Mappings may be established for generic keywords (which is where maximum gain may be) not just specific ones. Prior systems are unable to provide such mappings.

Personalization based on zip code, age and gender is provided in one aspect. For example, the query "weather!" would be processed based on the users location to produce for the user a summary of the weather for that location.

Shortcuts are not just a way to get users somewhere else quickly—pure navigation—but rather a technique to provide users a uniform way to enter all sorts of needs compactly and easily and get all sorts of things done/completed directly wherever they are. Shortcuts are also a compact way for users to refer to objects that they wish to manipulate in a variety of (potentially complex) ways. The several ways in which shortcuts can be thought of have to be merged in the most intuitive way so that users are not confused. The key is to recognize that the navigation view and the "getting task done wherever it can be done" view are really not that different. In this view, getting users to, e.g., Yahoo! Games when they express their need as "games!" is not very different from getting them Boston's weather when they type in "weather!" or "boston weather!".

In one aspect, existing content on the web—like bookmarks or directory listings—can be leveraged and translated to maps automatically, if a user so desires. Likewise, content on a server or set of servers, such as Yahoo!, may be converted, for example including the directory to mappings. So, for example, "Cat $15" could take the user directly to the 15th link in that specific category. Anchor texts, URL's, query-to-result maps, etc. are other examples of pre-existing mappings that can be leveraged.

The universal dialog box provides one central place for users to enter their needs immediately and directly as they arise. Users can enter anticipatory needs as well—needs that they are likely to have sometime in the future. If the need is such that a full interface is necessary, the need to switch is recognized, and a transition takes place seamlessly, e.g., by invoking the appropriate application(s).

A user ought to be concerned with the high-level goals and tasks that need to be done to achieve some purpose of theirs. In this view, in general, sending e-mail to a person is not a well-defined purpose in itself. A better statement of purpose is that one person needs to convey some information to another person and e-mail is one (of many) specific mechanisms of doing it. That information may already exists as an object or the user may first create it in some uniform way appropriate for creation of that kind of an object. Then, the issue of conveying it to the other person comes up and all the user needs to do is to specify the sort of communication desired—synchronous, asynchronous, delayed, to be made available at a particular time or in a particular context, voice, text, etc.—and the appropriate lower-level routines and applications—such as e-mail, instant messenger, or voice mail—are invoked at the right time and in the right way to have the object transported. Note that due to mappings (maps) and patterns that get established, users will not have to specify how the information is to be conveyed. From the context, situation, semantics of the content, and so on, in most cases, the system is able to figure out the right thing to do. When there is potential ambiguity, the user is asked to help as a guide. For example, "meet David 10 am" is sufficient to cause a calendar entry to be made, an e-mail to be sent, an alert to be set up, and so on. In one aspect, a message may optimally leave the sender in one mode but may get delivered to the recipient in another mode because of the particular context and the situation of the recipient.

In this view then, "sending an object by e-mail" is more closely tied to "sending a web page", "sending a Yahoo message", "publishing a web page (sending to a host)", etc. Reading e-mail is more distantly related. Reading e-mail, in turn, is more closely related to "reading a web page", "reading a local file", "reading a Yahoo message", etc. From the user interface point of view, applications—e-mail, calendar, travel booking, contacts list, etc.—should not have to be seen as something essential, whole, integrated, and indivisible. In fact, they are largely be transparent to the user, simply a part of some low-level mechanisms that, in many cases, a user need not even be aware of. In general then, the user just needs to specify the task or the lookup they need to do and the UDB system provides the right functionality/tool/application/lookup automatically.

It is important to note that the universal dialog box approach is not just an interface change but rather a fundamental shift in the way services are provided to users. It is also important to recognize that a "shortcut" is much more general than just labeling/coding maps; it is about users being able to express their needs in simple (e.g., natural or controlled vocabulary, imperative-style) language and getting their wishes fulfilled as directly as possible.

One of the key insights leverage by the present invention is the following: information needs that any particular user has can be quite complex. However, most (80-90%) of what users need to do is similar to what they (or someone else in their group, for example) have done in the past, suitably parameterized. That is why it benefits the user greatly if patterns are created based on what they have done in the past which they can leverage to do things more easily in the future. Label/code maps are a way to create and then leverage patterns. If a user always informs their secretary by e-mail when they make an entry into their calendar, we can make the operation automatic for them. It is undeniable that if a user wants to do a lot of one thing—e.g., send and receive lots of e-mails, organize their calendar extensively, carry out extensive stock portfolio analysis, etc. then it is better for the user to use the complete interface that the corresponding application or tool provides. The fact though is that in today's busy work environment, one is forced to do each of these sorts of things intermittently. A typical user's task pattern sequence is likely to be: answer an e-mail, answer a phone call, enter data into a spreadsheet, read a new e-mail that just arrived, enter a meeting schedule into one's calendar, look for information about a competitor on the web, and so on. In certain aspects, the universal dialog box interface is designed with this work pattern in mind.

Shortcuts provide an opportunity to expose the complete wealth of information/tools/applications there is available to a system, either on the system or over a network. Once maps are established specific to individual users, many things that a particular user desires are able to happen automatically.

A key point is that the universal dialog box is useful to enhance interactions between the user and the web (including Yahoo!) in both directions. Initiative on a user's behalf is proactively taken, and not just by simply responding to their requests—additional anticipatory action may be taken. In one aspect, therefore, the UDB system is preferably proactive and anticipates user needs. A simple thought experiment quite adequately establishes the power of this approach. Consider all examples in one's daily life—at work and at home—when one thinks of doing something on the net (or the computer) but doesn't because it is not a straightforward enough thing to do. Today something takes four steps to do and that is perhaps two steps too many. Over a period of time, for each of us there are hundreds of occasions when the only thing that prevents us from acting out our desire is the relative difficulty of accomplishing what we want to achieve. The universal dialog box provides a way to reduce these hundreds of occasions to tens or a few or one.

Code/label maps are a way to capture what is common in everyday life but almost does not exist in any meaningful form on the web. In everyday conversations, people make references to several of their and others' objects, their likes and dislikes, their preferences, events in their lives that have happened or are likely to happen in the future (say, they are getting married in 2 months), actions they have taken or are planning to take, and so on. The present invention provides a unique way to enable users to capture and share such references with friends, colleagues, family, or even the entire web.

One user interface design could be to have the universal dialog box appear as a narrow long, scrollable window on the side of the page. At various points in that space, users can enter their requests. Complete (or partial) history of their past interactions is available to them. One advantage of such a dialog box is that users do not have to scroll up or down to be able to enter their next request. If the box is narrow but tall, users may break up the queries they enter into a set of lines each containing a single concept. For example, they could enter "weather" on the first line, "new york" on the second line, and "this week" on the third. While sophisticated algorithms are provided to break up user queries into concepts, as discussed above, encouraging users to enter queries as a set of concepts can only make the interactions with the user somewhat easier and richer.

Shortcuts are not just about eliminating the need for the user to go to different interfaces for particular applications but also about interpreting the add-values that different tools and applications are able to provide so that several can be invoked at once in the same context. For example, an e-mail and an organizational chart may be linked. Or, if one receives an e-mail asking the user to come to an office in some office building, a map of the building indicating the location is automatically provided or displayed. The additional add-value features of this sort are provided through the Universal Dialog Box, which features users cannot get if they go to the complete interface for any particular application.

Users may use Perl-like $_ to refer to the current object, whatever it is. It could refer to a query, a web site, a link, or some other object. Also, codes such as $4 to refer to, say, their favorite search engine. So, for example, to run the query that you just ran on a different search engine, all the user needs to type is $5 $_

A variety of Unix-style powerful data/object manipulation options are provided in certain aspects of the present invention. For example, users can put in <any site, search string> and get results from that site for that search string (either run on our search engine or on the site's search engine, if one exists, or both).

The present invention makes possible truly universal labeling. People can call anything anything they like. Labels and codes can be arbitrary in character—entirely personalized to what the user wants. They could be strings of characters and numbers, sequences, or icons or some mix of each. Every user has a codebook that could contain a wide variety of labels/maps. Everything can be labeled. People can be labeled, so can other real-world objects like books and magazines and CDs. Arbitrary sequences of words like queries can be labeled, particular events can be labeled, all online properties and web sites can be labeled, groups of web pages can be labeled, celebrities, places, zip codes, etc. can also be labeled. So, for example, "my flight tomorrow" is a label referring to a particular object at one time and another object at another time. The labels are parameterized so that they adjust automatically. For example, "my flight next week" becomes "my flight this week" once the current week is over.

The labels are personal. Users have full flexibility in assigning whatever labels they choose. Suggestions for maps may be offered based, in part, on the implicit behavior of a user or groups of users. Likewise, the present invention provides tips personalized to users to help make sure that their need is satisfied.

In the code book can be included contact information of friends and family. Also, emergency numbers. So Amy can type in "Richard's phone number" (in coded form, if they prefer) and get that back immediately and directly. The coded form could be "$f4 ph" meaning phone number for my 4th friend. All the codes and labels are preferably available no matter how users invoke a service—by phone, using a desktop, or any mobile device.

The codebooks are preferably shareable—entirely or in part. For example, there could be several public and a private part of the codebooks. Parts of the codebooks could be shared with the whole world, some with just friends and family, some with work colleagues, and so on. Codebooks may be built for use within groups and organizations. These can be shared across an organization. Some users may be happy to have their universal dialog box interactions shareable with some or all people, in real-time or after some filtering. From the way experts in any field discover and use information, everyone else can benefit in this way. So, a user can choose to use codes of a friend or even that of a stranger at some particular point of time. For example, they can ask for "Richard's favorite SE", or "the movie Richard saw last weekend".

Codes and labels that pre-exist, for example used in SMS and so on, can be leveraged. There may be short-cuts to codes themselves. For example, there could be multi-level codes, in multiple senses. For example, codes $1 through $5 may be 5 different search engines but then a user may also have a code for "my favorite search engine" which points to a particular one of those 5SE's at a specific point in time. The UDB, would, based on the code invoke the applicable search engine (as well as a browser application). The same code/label may refer to different objects at different times. For example, the referent can change dynamically. For example, the code "latest issue of this periodical" refers to whatever the latest issue is. A special category of codes could be required to be persistent. Likewise, the referent of the code "My friend Richard's favorite bookstore" could change automatically whenever Richard's favorite bookstore changes (as indicated by Richard).

By use of codes, groups of objects—queries, URLs, links, etc. can be retrieved at once.

Codes may be used in a reverse way as well. That is, given a referent one can identify all the codes that point to it. If it pleases the user, wherever there is a reference to the referred-to object, they can have the label(s) in addition or as a replacement placed automatically.

Codes in the full form may be multi-level. There may be several pre-defined templates for such codes. For example, <whose codebook, topic, specific object> could be the format of a certain set of codes. In the code <$f5, $t1, $3>, $f5 could be a particular friend, $t1 may be "mathematics" and $3 may be the favorite probability text book of that friend. Likewise, another template could be <manufacturer, product>. So that <$2, $p1> is Sony's VCR while <$2, $p2> is Sony's digital camera.

Equivalent of the 'this' operator may be provided for shortcuts. For example, $3 !q could mean search at site $3 for the query that got the user there. Some pre-defined codes could be: !c could for this context, !s, this site, !!s, the previous site, !p, this page, !!p, the previous page, !!—previous command in the universal dialog box, and so on.

Another related feature the present invention provides is the ability to selectively change part of some object and run the query again. For example, if the user searched for "hotels in miami" and then they enter !m tampa, the new query is interpreted as "hotels in tampa". In fact we can support an even more powerful functionality leveraging the knowledge we have about category of concepts. For example, a second query "!q tampa" would be enough to search for "hotels in tampa". Leveraging category information, it would be known that "tampa" must replace "miami" and not, "hotels". If the user had entered "!q restaurants", however, the new query would be equivalent to "restaurants in miami".

Words as well as filters of all sorts can be added to prior queries, for example, in a straightforward way.

Certain codebooks could be built and shared across family, friends, and colleagues. These could contain labels that are useful across the entire group of people, for example, for an engineering team within a company.

Anaphoric references of the following sort are also supported ("my" can be replaced by "our", wherever it makes sense): my address, my neighborhood (!n), my time zone, my favorite perl tutorial, my favorite physics text book, my zip code (!z), my bank, my stock portfolio, my pet store, my pharmacy, my hair dresser, my cobbler, my wife's bank, my library, my friend's favorite perl site, my friend's company, the last sports site I visited, the last python site I visited, the site I visited after I visited the python site, the last search I did on cricket, and so on.

Certain references could be to physical stores (or their online versions). For example, "my bookstore" could be Amazon and "my search engine" could be Yahoo!. "my cdstore" could be Yahoo! Shopping. Some references could be to offline objects. For example, <$2, 0, 11, 7> could be a reference to the 7th URL on the 11th page of the current issue of a printed newspaper. In any context, an entire range of objects can be specified using the range operator. So, $7:12 could refer to every code between 7 and 12.

Codes could be prefix-free by design. For example, $2378 could be a compact way of writing $2$3$4$8.

Preferred notations for various labels may need to be worked out over time by a user. For example, for "the last site I visited on baseball", the code !sbaseball may be good enough. Codes can also be considered to behave like a macro in programming languages and can be inter-mixed with plain text. For example, if $t1 is philosophy and $2 is Nietzsche, then $t1@2ean aesthetics could refer to "The philosophy of aesthetics as per Nietzsche" where $t1@03 refers to the philosopher Nietzsche.

Labels/codes may be provided for current time, this hour, today, yesterday, last week, etc. For example, a user can compactly ask for "last week's logs" or "last week's periodical". Users can invoke the calendar for any month of any year.

In general, codes are created by users as they please. A user could be prompted to create codes when the system believes a code could be useful later. For example, if a user types in a complex query and appears to have found the result set useful the system may offer to them the option to refer to that useful query by some easy-to-recall code. Then, of course, such queries are reusable and will be reused and become shareable because codebooks are shareable.

Codes/labels may be complex structures in themselves. There may be a short description and a long description of each code. There may be also be several other attributes. Users could be provided an interface to manipulate some aspects of these complex structures directly, if that is what they want to do. In any context, any higher-level codes in a multi-layer code situation could be made sticky for a time. For example, if a user has adopted Richard's codebook, then, for the time being, all codes they use could be assumed to be drawn from there. Alternatives could be offered gracefully so that if a certain codebook cannot interpret the code, another more general/specific one which makes sense is looked up.

An example of a code that pertains to a group of sites is "all the sites I usually visit each evening". There could be codes/labels for particular tasks and scripts. For example, "book travel" could be code $1. There could be codes/labels for concepts such as "the movie I saw last week", "the movie I saw this weekend", "the movie I am planning to see tomorrow", "the movie my friend Richard saw two weeks ago", and so on. If movie times have been looked up or bookings made on Yahoo! network, a prompt to users to set up such maps may be provided.

The present invention provides mappings from labels to objects no matter where the objects are situated. For example, for some users "my travel agent" may be Expedia. The UDB takes them there promptly, directly, and effortlessly.

The codebooks are shareable and there is a viral effect built into the implementation. When a user sets up their mappings, they could be asked whether they would like their family and friends to be notified that they now contribute to this feature. Likewise, when new mappings are added to the codebook, interested users could be notified. Similarly, when referents to maps change, interested users could be notified automatically.

One can refer by number to bookmarks, links on a page, etc. For example $b37 might refer to the 37th bookmark in some category. One might also be able to find it by entering enough initial letters to be able to make disambiguation possible.

Users can be offered special ways to express queries. For example, instead of putting double quotes with a preceding "and a following", they could just put the prefix \w. Codes can also be used to force particular interpretations of queries. For example, "$a 97 Honda" might mean that it is an address. Queries could include special escape sequences to make the search engine override certain default behavior. For example, whether a URL (referred to by a code, or fully) should be interpreted as a request to go directly to that particular web site or not may be indicated by a single character preceding the URL.

Sequences of steps may be coded as a simple code. For example, there could be a code for: go to page P, click on link L, on the resulting page click on link L' and then return the corresponding page to me. (This will make even more sense when parameterized.) A special case of this is the straightforward "I feel lucky" feature which, for any query q, takes the user to whatever the first result is.

Some maps can be to be sets of items. For example, $s may map to 5 or 10 search engines. "Play BBC" or "launch BBC"—may be set to play BBC on Yahoo! or other portal. If the only thing the particular user ever does related to "BBC" is to launch it, then just the query "BBC" is good enough. In this way, several kinds of commands of this sort suddenly become possible. Traditional sort of bookmarks cannot support this kind of functionality.

A user can, at will, pick up other people's labels/codes/bookmarks. They can also pick up all sorts of scripts, patterns, macros, etc. as well.

Other examples of functionalities supported include: "mail $5: see you in 1 minute" or "show me unread mails" or "show me all mails (and/or messages) received in the last 24 hours" or "move this mail/message to $7 folder". A longer e-mail can also be written, using a larger version of the universal dialog box. (The universal dialog box can be thought of as a re-sizable x-window. Whatever size a user chooses can remain fixed till they choose another size.) Perhaps a better name for the universal dialog box is universal dialog window—the one and only window anyone needs to the (networked) world of information, tools, and applications.

Other categories of commands supported include: "publish this at my Geocities page", "show me the following file on my desktop", "send this web page to $5 (with the following comment): . . . ", and so on. Another kind of command supported is: "find David in $_" where the current context could be a web page, an e-mail, a web site, an e-mail folder, etc.

The present invention extends the notion of a map of a query to a particular result in two ways. The query can be expanded to include all patterns that correspond to the query semantically. For example, a user could type in "hotels in seattle" or "hotels in seattle, wa" or "seattle hotels" to get the same result. The result of the map could also be extended to be something beyond just a single result. For example, if a user regularly appears to look at 2 or 3 or 4 of the results of some query, a map that links the query to exactly that subset of results may be provided. The present invention also offers an easy way to navigate directly from one result to the next.

Contact information can be accessed and added to/modified directly. Users can also use the universal dialog box to create lists of any sort—lists of things to do, shopping lists, grocery lists, whatever. Tools and applications are provided in certain aspects to help users create elements for such lists automatically. These lists will be accessible to the user no matter where they are. For example, a user might forget where they had to go next or what else they needed to purchase while traveling, e.g., on the way home from work. They can access the system from their car on the cell-phone and have the relevant part of the list read out to them using text-to-voice technology.

In certain aspects, passive content of all sorts is actionable. This includes content that is not a link but just plain text. For example, given a list of expressions anywhere on a page, a user can ask "$q$57" meaning run the 5th and 7th expressions as queries. Maps need not be just single item to single referent sorts. They could include use of regular expressions to specify patterns. For example, a user can ask that any for any query they make of a certain sort—say for a domestic US city—such and such results and information should appear in such and such order. So, in general, maps are from query/need patterns to referents (one or many). Query patterns can be suggested by the user or discovered by the query categorization algorithms of the present invention.

Maps may directly access parts of a network site, e.g., IY (Inside Yahoo!) (to see the content directly) for particular queries or query patterns. Likewise, maps to directory content are possible.

Users may set their (customizable) environment variables as they like. Certain environment variable values could be set via a series of commands even before a user starts to put in their query/needs. Existing customization options could straightaway be converted to environment variables whose values the user can change in the Universal Dialog Box. More complex operations of the following kind are also supported: "find meeting times this week for $2" where $2 refers to a particular team of people working on some project.

Another generic operation type is of the form "list x" where x is any of a variety of things. Intersection and union of lists is also supported in certain aspects. For example, "list x and y" could mean show what is common in those two lists while "list x or y" could mean show what is in either or both.

Sunrise, sunset, phases of the moon, personal horoscope etc. are also available right at the universal dialog box. For example, "my horoscope" will get users their daily or weekly horoscope. Users will be encouraged to import maps from elsewhere. For example, they can request that all their personal bookmarks be imported as maps. Even references to pre-defined labels are customizable so that users can choose their own labels to refer to any of the pre-defined labels. Users can refer to particular areas of their interest compactly. For example, when they make a "my entertainment bookmarks" request, the system may show them those bookmarks of theirs that belong to the entertainment category.

Users can go to a particular result directly by just entering the number of the result. For example, $r$7 could take them directly to the 7th result in any block of results. This works for sponsored search results, e.g., IY, as well as the main search results. Users can ask that the UDB be cleared or even the entire history during this session be cleared by using a command such as "clear".

Bundles of objects can be labeled. For example, a query string along with the preferences that go along with it. Likewise, a code as well as the relevant part of the codebook so that results of applications of codes can be shared among users more easily. URL completions may be automatic so that "go ebay" is interpreted as "go www.ebay.com". Crucially, user intentions are leveraged in certain aspects, both individual and in the aggregate, to determine the most appropriate behavior to provide to the user.

Yellow page queries of the following sort are also supported: "opening hours Fry's $." to find out the opening hours of the local Fry's store.

Once the blocks in the search results page(s) (and in other pages) are clearly marked out, users can jump to any of several places using simple codes. For example, "$s4" could take them to the 4th sponsored search, "$i3" could take them to the third IY result, and so on. Users can specify several links to be visited at once. For example, they could enter $s3r14 meaning sponsored search 3 and web result 14. Users can also establish maps in the Universal Dialog Box explicitly. For example, given a phrase in some article that they liked, they can map the phrase to that web page by simply typing: "phrase:$_".

Maps can be made very precise about the nature of the referent. Anchor texts, URL's, and queries of today do not support this property. For example, a map could indicate clearly that its referent is a single web page, or a web site, or a set of web sites. They can also point to specific parts of those objects.

Users can create a label in any natural or private language for whatever referent they want to reference. For example, they can enter labels in Chinese for English content. They can even establish their own maps between English phrases and Chinese phrases. When they view content in English, no matter from where, the Chinese phrases corresponding to the English entries could be made available in addition to or as a replacement of the original text. Referents that are lists are also supported. For example, a user may wish to maintain a list of those celebrities about whom they are especially keen to find out the latest gossip. They can at will add to such a list or delete items from such a list using the Universal Dialog Box.

Through the Universal Dialog Box, the history of any particular tool or application the user used in the past can be invoked directly. Thus, for example, the user can get the last five e-mails they read/wrote, or they can get the last seven map lookups they did on Yahoo Maps, or they can look up the last ten businesses they looked up using Yahoo Yellow Pages, and so on. More precisely, the tool or application will be in the background and need not be explicitly mentioned. That is, they can simply ask for "last five directions" or "last five business lookups", etc. The UDB system determines what tools must have been involved and return to them the correct lists. This is a very important feature because of the "recency" effect in the sense that the likelihood that a user will need to look again at something they looked at recently is very high.

The present invention provides the ability to look up material on the Intranet immediately as well. For example, one can find out the phone number for a colleague in a conference room using the Universal Dialog Box. A user can iterate through any data they entered anywhere. The data they enter is automatically converted into a map. For example, if they entered ten items of data in five different forms during this session, they can get back what they entered in any of the forms by simply putting in a reference to it.

Complex queries can be built up through several steps just as several forms have sometimes got to be filled by the user before they can completely specify what travel plans they seek to make.

In certain aspects, the UDB system supports a Turing-complete set of code map features. For example, both "if" and "while" statements are supported. For example, there could be patterns built in as maps: "ifYHOO >25 go to Stock broker site and get such and such information".

Since the human brain is tuned to perceive visual icons more efficiently than text, use of icons as references in maps is also implemented.

The present invention allows for referents of maps to be maps themselves. The present invention also supports the equivalent of a lisp-style "eval"-type operator which can be applied to the result of first operation. For example, "eval('the movie Richard saw last weekend')" could take the user to a search results page or a specific page for that particular movie.

In certain aspects, a larger universal dialog box is provided to help in the case of more complex queries because the user is encouraged to put in everything they know about their need. For example, a user may put in everything they know about some long-lost friend they are looking for: first name, university they went to, where they lived, where they worked, and so on. The search functionality may then process the information to determine concept units as above, generate a series of queries, blend the corresponding search results and provide the blended results to the user.

The present invention provides highly sophisticated query completion features. As a user types, related words and units are shown (could appear in a drop-down box). These could be based on related searches but personalized to an individual user. For example, when user types in "sf", a drop-box showing weather, hotels, restaurants, etc. may be shown based, in part, on what this user has searched for in the past about "sf". Users can enter queries that are cross-products either explicitly or implicitly, similar to holding one part of the query constant and varying just the other. For example, if one is flying from place A to D via B and C, we could look up weather at each of the places at once. Also, look up directions, maps, restaurants and hotels nearby for D, all at once.

Cross-product queries may be created by intersection of two or more lists that the user happens to have as maps. For example, the user may have a list of cities they are traveling to and a list of things they need to find out about each. If each of these lists has four items each, the user can generate 16 queries by the simple command such as "11×12".

To make it easier for users to enter labels and queries, the present invention provides drop-down boxes that appear incrementally as user specifies their need in more and more detail. The present invention also provides a drag and drop query formation interface so that users can put in text strings, icons, codes etc. as they wish to create their requests.

Users are able to map to particular news items or auction items (or whatever else they are tracking). For example, when a new story breaks and the user appears to be showing plenty of interest, the system may ask whether they would like to create a code/label for it so that they can then track the developments more easily.

Users can specify at one time a set of things they need (in coded form) and they appear on one page or separately as a group of close-knit pages. For example, $2$5$7$9 may get back san francisco maps, weather and hotels, all at once. So, users can find in an instant "latest cricket score" of whatever match they happen to be following. They can find the "latest flight information" for whatever flight they are tracking. Aggregate possibilities also exist. For example, a user can request that search be carried out at the most favored search engine (among their colleagues) for a particular category of searches. Users can also set up maps so that, for certain category of searches, one particular set of search services are consulted first.

A larger universal dialog box allows for related searches to be shown to the user right next to their original request. When a request is ambiguous, the system may present to the user a list of possible interpretations from among which they can select the one that they intended to express at this time. If a query is ambiguous, the system may show on the same results page (in clearly separated blocks or in several tightly-knit pages) results that correspond to the most likely different interpretations of the need. Whichever one the user shows interest in, system may then show more of. For example, when the user types in "java" as a request, then one block of results could correspond to the programming language interpretation, another to the coffee bean interpretation, and yet another to the Indonesian island interpretation.

Users are able to able to express in a compact form complex, multi-step operations. An analogy to Unix-style pipes can be made. For example, they can ask for "Java|programming language" meaning show results that pertain to Java as a programming language. They can also ask for "Java|excluding programming language". The key is that the system provides to users the ability to ask that the results be filtered based on some criteria of their choice. Users can also get information from one source sent to another place. For example, "$. Hawaii wed 1 week|mail $5" could mean get me cheapest travel option from where I live to Hawaii leaving on Wed for 1 week and mail it to $5. The information might also appear on the screen of the user as well. Likewise, when they enter something into their calendar, it can be programmed (or they can explicitly ask) that their secretary be mailed or the person they are meeting be mailed. For example, "update David 10 Wed|mail $7".

Interesting functionalities that involve data from and computation at several sources are also supported. For example, "$_|publish anchor text: . . . " could publish the attachment of an e-mail just read as a link to the user's home page with the anchor text as provided. Users can also use redirection operators to put some content into some file. They can also request that some content be read from some file. For example, some of their queries may be in a file. A user can ask that they all be run one by one. Similarly, URL's may be in a file and a user may wish that the corresponding pages be visited one by one.

Expressions such as "Go to the URL in David's last e-mail" will also be understood and immediately acted upon. Users can request access to shared objects of all sorts. For example, a user can type in "calendar David today" and get to see his friend or colleague David's calendar directly.

Drag and drop and other simple interfaces are provided for users to be able to create complex queries. These could be shown visually with boxes representing operations and arrows between them representing data flow. All queries—no matter how complex and however rich the context—are storable, shareable and reusable. All sorts of patterns (no matter how complex) can be stored, parameterized as necessary so that the referent could change over time.

Users can book airlines, hotels, restaurants, and car rental at up to 4 different sites in one continuous, streamlined way by simply typing "$4;$3;$7;$9" where the four codes refer to 4 sites that offer the facilities to book one or the other of the above. Maps can be to a specific part of any content, for example, a single image or paragraph somewhere—in the content for a specific web service or portal, or in content anywhere on the web. This provides a way for people to refer to and share specific parts of content right across the web. Maps can be to particular part of any content, for example, a single image or paragraph somewhere—in a web site's content or in content anywhere on the web. This provides a way for people to refer to and share specific parts of content, right across the web.

Some people will naturally stand out as more effective mapmakers and their efforts (as long as they make them shareable) will be enjoyed by more and more users. Users can use others' maps and also vote on them.

Some other features provided to the users include: temperature conversion between Centigrade to Fahrenheit, pounds and kgs, cms and inches. Also, somewhat more complex calculations like, given a temperature and wind speed, find out the wind chill factor value. Postal rates, zip codes, thesaurus, dictionary, encyclopedia, spell-checking, yellow pages, white pages, reverse phone number lookup, tv show schedules, movie schedules, etc. are also be available through the universal dialog box. Users can find out about and be informed about emergency/disruption situations. For example, "$. alert" query would return a value if there is a current weather-related alert. Likewise, they can find out if there is a general power cut in their area. Users can enter notes of any sorts and look them up. They can maintain brief (or fuller) logs of any sort. They can put in tips and hints. They can also use the feature as a memory aid to keep track of hard-to-remember things, like how someone's name ought to be pronounced.

In one aspect, an entire Yahoo Messenger session can be run in the universal dialog box. The user can interact with one or more people. Likewise, basic web conferencing is supported in the UDB. The universal dialog box can also be used to do in situ querying. This means that if a user has just completed a travel lookup and discovered the options available to them for traveling from A to B using American Airlines, they can simply ask "$. United" and get back the results for the same lookup on United. Commands such as "buy $. At Amazon" are supported where $. refer so the current book title/query.

In the universal dialog box, a user can enter a set of items and ask that we find more like them. For example, a user can put in a query and ask for other queries like that. Or they can put in a reference to a web page or site and ask for more pages like that. The command "compare x y" is available for a wide variety of x and y. For example, x and y could be two rival products. A user can look up personal information of all sorts directly. Suppose, for example, David is a friend or colleague of the user. Then, for example, "David's picture" returns a picture of David, "David's birthday" returns the date of birth of David, and so on. Users can specify a date or a range of dates to find out from among a group of colleagues—friends, family, colleagues, or celebrities—who have their birthday in that period.

Whenever a response is shown, the user may view the response in the full, original context (directly, or via following a link). Thus, for example, once they have looked at an e-mail they can ask that they be shown it within the context of the full-feature e-mail program.

Certain features/functionalities could be announced more prominently at particular times of the year. For example, tax-related information could be made more easily accessible when the period in which tax returns are commonly prepared comes around.

Games features are also available via the universal dialog box. For example, "Give me a puzzle" would result in a random puzzle (of the right level of difficulty due to customization by the user or the system's prior knowledge of the user's aptitude) appearing. Similarly a user can ask for an anagram or another kind of crossword clue to solve. They can also play simple games with the computer or with other users.

Users are given the option of extending right across the network whatever alerts they wish. For example, alerts could be placed next to the universal dialog box—for example, a major breaking news alert, a mail arrival alert, an auction progress report alert, etc. Users can also put in links on pages that may not have been there originally. Whenever the users move to those pages, the links appear.

Users can use the universal dialog box to provide feedback, write summaries, write reviews etc. For example, a user can type in a message to hp: "Tell hp their latest Pavilion is not good". Users can also choose to see any content via the perspective of any relevant/related stakeholder. For example, if they wish to see directions to get to a business at any site, the business can point out that the directions are not exactly correct but should rather be such and such. Patterns can be made to apply to all sorts of situations. For example, a pattern could be established to help categorize e-mails based on how the user has categorized e-mails in the past. When a user has received an e-mail to read, we can suggest "move $_ to folder $45" and, by default, or if user gives assent, exactly that happens.

Query ticker in which queries of any of a variety of pre-selected sorts could be shown might also appear in the universal dialog box during quiet periods. Several query tickers could be running simultaneously. Similarly, there are sports score tickers, stock tickers, breaking new tickers, and so on, all personalized to the specific user.

Translation is another feature supported within the universal dialog box interface. A user can enter or paste text from one language and get its translation into the language of their choice.

Operators such as "next" and "more like this" are polymorphic in the extreme sense. So, in the context of search results page, "next" will take the user to the next set of results for the same query. In the context of a particular search result, "next" could take the user to the next result. Likewise, "more like this" can be used to get more searches related to a given query, or more sites similar to a given site, and so on.

Users can ask for enrichment (add-value) from any source when they are looking at any other object. This is not just a one-time thing where a user has to explicitly ask for the information to flow in the desired fashion. Rather patterns can be established by the users, based in part on suggestions by us, so that some specific add-value appears in exactly all the right circumstances. For example, in the business setting especially, it helps to know what role or group the sender of a particular e-mail, say on a mailing list, belongs to. Simply by tying the organizational chart information to the e-mail address of the sender, information about the sender that could be of use to the recipient could show up or at least be available directly. Spell-checking is another sort of add-value that could be made available across the board. No matter which search box the user enters a query into, mistakes are corrected and the most appropriate alternatives offered.

Enrichment can take the form of filtering and classification of the original information. For example, given the long list of birthdays of employees in some company, a user should be able to find out easily which, if any, colleagues of theirs are included in that list.

Users may have to specify a full query/need in the beginning but once the system recognizes their intent, just a short hint from the user is enough for the desired thing to happen.

As should be the case, for those objects that are most familiar to the user and that they need to access most frequently, the codes are the shortest and easiest to use. It is crucial to note that the present approach works precisely because it is based on personalization. There can be no short enough codes that can cover everything that all users in the world ever need.

In any particular context, as specified by, for example, a particular user and the task and the situation, ways to get fulfillment of the most likely needs that arise are made immediately available. For example, when the user indicates interest in some particular neighborhood store, the questions that they are likely to ask are anticipated. The most likely questions, in this case, could be the about the opening hours, phone numbers, maps and directions, and so on.

Part of the interest of codes/labels are that there'll be interest in simply finding out what codes exist and what their latest referents are. For example, for the label "movie Richard saw last weekend" there is a (different) referent depending on whether or not Richard saw a movie last weekend. For example, a user may put on an alert on particular maps themselves so that they can be informed when the referent to a label exists and whether or not it changed in some period of time. A user can set up alerts on particular labels even if no referent exists at the moment. As soon as someone sets up a (shareable) label with that matches the specified label, the user could receive an alert.

Users may add annotations to labels of theirs or those of others. Some user may point out that perhaps such and such referent is now a better map for some reference. Some annotations and properties of maps could control when those maps are used. They could indicate when a particular map is more or less likely to be useful. It is up to the user to see the annotations they wish to see and make use of them as they wish.

Codes/maps also provides a way to build a recommendation feature. For example, "my dentist" maps for colleagues in a particular workplace might reflect who is a good dentist in the area. This will work especially well when maps are also annotated. For example, a colleague can make a remark about the bad experience they had with "my dentist" during their last visit. These remarks can also be leveraged.

In one aspect, the Universal Dialog Box is implemented as a thin window on one side of a browser window. A user can enter a query including words and phrases from the text they are viewing simply by entering the position of the word or phrase next to the line they are viewing. For example, next to the 27th line on the page they could enter $6:8 to mean search next for the sequence of words on that line between the 6th and 8th positions. One can also support similar functionality using other interfaces. For example, the user may select the portion of the line of interest to them for the query to be fired.

To be able to add mappings to their maps, users might be offered clever interfaces. For example, "touching" (bringing the mouse atop the object, for example, a red dot, briefly) a little red dot next to each product in a display of a list of products could make the product a part of the map.

Sometime one really loves some expression one has read on a web page. One wishes to remember it. The present invention provides the user the facility to maintain the expression as a map. They can simply paste it into the Universal Dialog Box. If they like, the context can be maintained automatically so that when they next look for that phrase, the corresponding web page could be made available directly with the location of the phrase highlighted. Today, readers of books often underline, highlight, or bracket interesting expressions and sentences. The present invention provides a much richer functionality of this sort to users.

Anchor texts and navigational queries are existing examples of maps to certain kinds of objects. The present invention provides to the user the possibility of having their own labels to such objects. If a user likes, the existing anchor texts on web pages could be replaced by their labels while maintaining the respective referents.

Users can also use the background browsing feature in which certain content—based on established patterns, profiles, and situation—could be downloaded and organized in the background. For example, each morning before one leaves to take the train to work, the most relevant stories from a set of newspapers could be downloaded and organized on the user's laptop which they carry to work.

A user can ask to see the complete history of referents for some reference code. For example, by asking for the reference of "movie Richard saw this weekend" over a period of six months, a user can get to see a complete list of movies Richard has seen in the last six months. Given a pattern of any sort, the user can ask that the list of objects corresponding to it be traversed in time or in space. A slideshow feature supporting the display may be implemented.

Codes and labels have numerous advantages for the user. One of them is that codes will prevent several typing errors. For example, if people use the ever-reliable code for 'britney spears' rather than typing it, it is much less cognitive load and far fewer mistakes are made.

The labels are preferably stored at a network interface or server system, e.g., Yahoo! server system, such as server 160 shown in FIG. 2 or server 460 as shown in FIG. 5, so a user can move from computer to computer, and device to device, and be able to access labels and mappings at any time over a network and still get all the benefits.

Another advantage of the persistent, universal dialog box is the potentially automatic use of an equivalent of the "&" shell operator. No longer will there be a plain, endless request-response, request-response sequence of user action. Rather, users can type several commands at once or type another command while the first one is still being processed. Likewise, the system can provide several responses and follow-ups at once. Whenever the response is ready for complex requests, it is shown in the complete original context, of course. In some cases, by the time the response to a complex request is ready to be shown, the user may have navigated through several other places.

Another advantage of the universal dialog box approach is that users get to see all sorts of information—from a variety of tools and applications—in the same uniform, easy to use interface. The impact of the idea should be very positive on users and thereby on usage of information, tools and applications the present invention provides.

In one aspect, the maps created are leveraged to determine more effective query categorization: For which query or query patterns to show what categories of results, and in what order. There is a very important implicit feedback loop that will come into existence. The power of the aggregate—the collective brain—will become visible in this context as well. For example, once a group of different users have mapped the query "laptop" (or the corresponding query pattern) to ibm, dell, sony and hp, the system can make (ordered by popularity or something slightly more complex) the most popular mappings available to users as search results. A mapping is considered to be popular based not just on how many people created it but also how many people use it and keep using it. Also, not only the establishment of maps will be monitored, but also their usage, and the usage of the reference as well as the referents. Thus, unlike bookmarks etc., the knowledge acquire about user intent in the present system is based on what users are truly interested in at any moment. If one only analyzes bookmark files, one is bound to be missing something vital. It has been observed that, on average, users have tens of bookmarks most of which they almost never use.

Some users are happy to type but do not much enjoy having to position their mouse on links to click on them. Others find the second way of interaction easier than the first. The present invention provides both options uniformly so that users can choose whichever one works best for them at any point of time.

Maps/codes also provide a way for novices to understand how experts in any area think and work. By looking at both the reference and the reference of the maps of the experts, people can gain deep insights into any particular area.

The present invention provides to the users the ability to label by need (how they use it) rather than how something—a tool or application—is named. For example, some users may have trouble figuring out where to look for something. For example, they are not sure whether they will find something using yellow pages or maps or yet something else. The present system spares them the need to understand and memorize which vertical service provides what functionalities by giving them both the opportunity to enter their needs in a uniform way in the Universal Dialog Box as well as by providing satisfaction of their needs in the same universal interface.

Examples of existing maps such as anchor texts are inferior for a variety of reasons. One main reason is that, for example, in the case of anchor texts, the creator of the web content decides how to refer to another object. In contrast, maps of the sort provided by the present invention allow each user to decide how they want to refer to whatever they want to refer to. Shortcuts will also be very useful for entry of needs into mobile devices or by voice. Usage of shortcuts will provide a way to handle plain queries/needs better as well. For example, by leveraging the usage of shortcuts that invoke weather information using the "w:" code, the system can determine the correct category of concepts, in this case the cities of the world. The system can then make use of the more and more effective categorization of concepts and queries to provide users more relevant content, e.g., from IY etc.

Codes are preferably context-sensitive, by default. So $3 can refer to the 3rd search engine or to the 3rd restaurant, if the context disambiguates adequately.

Object-oriented approaches are an integral part of the present system. Polymorphism is employed extensively (like in programming languages). For example, the same symbol can represent one thing or another depending on context. Inheritance is another aspect of the present system. Codebooks can be inherited. If a code cannot be deciphered using a user's codebook, the codebook of the group they belong to might be used, by default.

For any particular user, an arbitrary number of mappings are supported. Naturally, no matter how many mappings there are, only a small subset of mappings are likely to be used frequently and those can be cached.

In one aspect, maps themselves are first-class objects. A user can create a map and ask that it be forwarded as a suggestion to someone else. For example, a concerned mother could make maps for her son who is at school—for school work, or for nutrition, or something else. Maps also have an ontology of their own which make them browsable as well, both in aggregate and for a specific user.

Although stored on servers by default and hence available from anywhere, replicated versions of codebooks may be stored close to the edge or at the user's desktop, for efficiency and performance reasons.

Users are preferably actively given the option to build a mapping whenever the opportunity arises. For example, if the system determines (one or two or three times) that a particular user queries "hp" and then clicks on a search results link which takes them to www.hp.com, then the system can offer to the user the option to make a map from the query "hp" to www.hp.com. If the user gives their assent, then the map is created. Similar approach applies to any situation where the system discovers a regular pattern of behavior which may be simplified through use of short-cuts that leverage patterns.

In one aspect, the universal dialog box provides a single point of entry to users for all services that a provider or even the entire web provides. One way to think about the universal dialog box is that it provides a channel of communication with the user which remains open and active no matter what the user is doing. Dialog is no longer just a user request, provider response, second user request, second provider response pattern. Rather, a provider can take initiative and offer highly targeted promotions etc. in context whenever it makes sense in order to get users interested in something. Likewise, the system proactively offers to the user opportunities to build maps of all sorts. Premium search services can be offered for a charge, some features of which can be drawn from the shortcuts approach described herein.

Maps can also be from a session to objects. For example, the user may have discovered some interesting products in some category during a browsing session. Later on they want to show just the interesting products to their partner. Next to each object/product an option could be provided. The same should be true for any ads/promotions. In the universal dialog box, users can enter needs that'll arise in the future. This idea has a huge business potential. A user can express a need that they will be traveling to Europe this spring. The system keeps track of these needs and tries to fulfill them. For example, a user can request that a flight that someone they know is taking two days from now be monitored.

A persistent dialogue with the user also provides opportunities for the system to highlight features, functionalities, and content proactively thereby increasing the exposure of unique content, and powerful set of tools and applications, spread out over a large set of properties. Promotions may also be run that build up over time like some ads in newspapers that make one curious each day till they finally reveal at the end of the week what they are really all about.

Figure 7:

FIGS. 7 and 8 illustrate examples of functionality provided by the UDB interface system and methodologies of the present invention as described herein. In particular, FIG. 7 illustrates a web page provided to a user system in response to the user entering a predefined code or label in the UDB 500. For example, with reference to FIG. 6, when a user enters the code "travel!", the system accesses the mapping stored in the system, e.g., at server 160 or other server system(s), or within the client system, and determines that the entered code maps to a "travel" page provided by Yahoo! A network request, e.g., HTTP request, is then sent to Yahoo! to access the travel site (either from the client system or a server that accessed a mapping table), and responsive thereto the travel page shown in FIG. 7 is sent to the user (e.g., using HTML). The page provided also includes a UDB 500 prominently displayed thereon. FIG. 8 illustrates a web page provided to a user system in response to the user entering another predefined code or label in the UDB 500. In this case, with reference to FIG. 7, the user has entered "define (argument)", where argument is a text term for which a definition is sought. Here, the text argument is "quantity". The system accesses the mapping stored in the system, e.g., at server 160 or other server system(s), or within the client system, and determines that the entered code identifies that a dictionary definition for the argument should be provided. The system locates the dictionary definition and provides it to the user as a separate web page. In this example, the system also performs a search for the argument and provides the results below the definition as shown.

In certain aspects, the labels, codes, parameters, and any other mappings of the present invention are searchable. Additionally, references to labels as well as what the labels map to may be searched as well. For example, the label names may be searchable and the label referents may be searchable. In one aspect, an ontology hierarchy of labels is provided where labels are assigned to nodes on a network. An example would be in the Yahoo! Directory, where various nodes represent different topics. In this case, users may navigate through these labels across the various nodes in the network.

While the invention has been described by way of example and in terms of the specific embodiments, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. A computer implemented method of processing a user input to determine an action to be taken based on the content of the user input in a client system, the method comprising:
    displaying a dialog box on a graphical user interface display associated with the client system, wherein the dialog box is a single entry search box having a default size and location, but is operative to have the size and location reconfigured based on user input and is capable of being included in a toolbar of a browser window;
    receiving a user input into the dialog box, wherein the content of the user input includes a user-defined label that is stored to a mapping table that maps to an executable procedure;
    processing the content of the user input to determine an action to take based on the user input content, wherein the action includes one of performing a search using the user input as a search query and accessing one or more executable procedures residing on the client system to perform further processing based on the content and the action is capable of being both performing the search and accessing one or more executable procedures;
    receiving a codebook from a remote system, the codebook including a mapping of one or more labels with one or more executable procedures, the codebook labels being defined by another user; and
    storing the codebook to a memory unit in the client system; and
    displaying a result of the action on the graphical user interface display.

2. The method of claim 1, wherein the executable procedure is selected from a group consisting of an e-mail client, an instant messaging client, a database management client, a document management client, a calendar client, a browser client, a spreadsheet client and a file transfer client.

3. The method of claim 1, wherein processing includes accessing the mapping table using the label as a key to identify an executable procedure.

4. The method of claim 3, wherein processing further includes invoking the executable procedure to further process the content.

5. The method of claim 1, wherein the content includes a user-defined label that maps to a plurality of executable procedures.

6. The method of claim 5, wherein the plurality of executable procedures includes at least one application selected from a group consisting of an e-mail client, an instant messaging client, a database management client, a document management client, a calendar client, a browser client, a spreadsheet client and a file transfer client.

7. The method of claim 1, wherein the content includes a natural language label for a specific need, and wherein the natural language label maps to one or more executable procedures residing on the computer or on a network coupled with the computer.

8. The method of claim 1, wherein performing a search includes invoking a browser client on the client system and sending the search query to a remote server.

9. The method of claim 1, wherein a context of the user input is determined based on a format of the user input, and wherein determining an action to take is based on the context.

10. The method of claim 1, wherein the user input is received via one or more user input devices associated with the client system.

11. The method of claim 1, wherein the processing includes identifying one or more labels in the user input, and wherein accessing one or more executable procedures includes identifying the one or more executable procedures using the codebook.

12. The method of claim 11, wherein identifying the one or more executable procedures includes using the one or more labels as a key to lookup the one or more executable procedures in the codebook.

13. The method of claim 1, wherein accessing one or more executable procedures includes one of executing one or more APIs configured to interface with the one or more executable procedures and executing one or more scripts configured to interface with the one or more executable procedures.

14. The method of claim 1, wherein the action to take includes delivering information to a user based on a context of the information to be delivered.

15. The method of claim 14, wherein the delivering information includes providing the information using one of a mail application, an instant messaging application and a browser application.

16. The method of claim 1, wherein the user input includes a plurality of separate entries, wherein processing the content of the user input includes processing the content of each entry separately.

17. The method of claim 16, wherein, for each entry, the method includes determining an action to take, wherein each action is determined based on a context of the entry.

18. The method of claim 1, wherein the action includes performing a search using the user input as a query, wherein the search provides one or more search results, the method further including establishing a communication link with a remote site associated with one of the search results.

19. The method of claim 18, further including receiving additional information from the remote site and providing the additional information and the search result to the client system.

20. The method of claim 1, wherein the action to take includes accessing two or more of said executable procedures and displaying information from each of said two or more executable procedures.

21. The method of claim 1, wherein processing includes accessing a first application, and wherein further processing includes accessing a second application based on the content.

22. The method of claim 21, wherein the first application is an e-mail client, and wherein the second application is one of a spreadsheet client, a calendar client and a browser client.

* * * * *